United States Patent
Kokeguchi

(10) Patent No.: US 8,999,430 B2
(45) Date of Patent: Apr. 7, 2015

(54) METHOD OF MANUFACTURING DISPLAY ELEMENT

(75) Inventor: Noriyuki Kokeguchi, Kokubunji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1052 days.

(21) Appl. No.: 12/600,928

(22) PCT Filed: May 1, 2008

(86) PCT No.: PCT/JP2008/058357
§ 371 (c)(1),
(2), (4) Date: Nov. 19, 2009

(87) PCT Pub. No.: WO2008/146573
PCT Pub. Date: Dec. 4, 2008

(65) Prior Publication Data
US 2010/0166946 A1 Jul. 1, 2010

(30) Foreign Application Priority Data

May 25, 2007 (JP) ................................. 2007-138897

(51) Int. Cl.
*B05D 5/12* (2006.01)
*B05D 5/06* (2006.01)
*C09D 11/36* (2014.01)
*G02F 1/161* (2006.01)
*G02F 1/155* (2006.01)
*G02F 1/15* (2006.01)

(52) U.S. Cl.
CPC ................ *C09D 11/36* (2013.01); *G02F 1/161* (2013.01); *G02F 1/155* (2013.01); *G02F 1/1521* (2013.01); *G02F 2001/151* (2013.01)

(58) Field of Classification Search
USPC .......................................................... 427/58
See application file for complete search history.

(56) References Cited

U.S. PATENT DOCUMENTS

| | | | | |
|---|---|---|---|---|
| 5,764,401 | A * | 6/1998 | Udaka et al. ................... | 359/270 |
| 2001/0042855 | A1* | 11/2001 | Tonar et al. .................... | 252/583 |
| 2003/0076573 | A1* | 4/2003 | Gates et al. .................... | 359/245 |
| 2003/0184692 | A1 | 10/2003 | Nagae | |
| 2004/0252099 | A1 | 12/2004 | Walder | |
| 2005/0270619 | A1* | 12/2005 | Johnson et al. ................ | 359/265 |
| 2006/0066933 | A1* | 3/2006 | Jagt et al. ....................... | 359/265 |
| 2007/0041785 | A1* | 2/2007 | Raaijmakers et al. ............. | 404/9 |
| 2007/0201187 | A1* | 8/2007 | McGregor et al. ............ | 361/503 |
| 2008/0266642 | A1* | 10/2008 | Burrell et al. ................. | 359/270 |
| 2009/0027757 | A1 | 1/2009 | Kokeguchi | |

FOREIGN PATENT DOCUMENTS

| | | | |
|---|---|---|---|
| EP | 1 887 416 A1 | | 12/2006 |
| JP | 2007-025219 A | | 2/2007 |
| WO | WO 2004/067673 | * | 8/2004 |

OTHER PUBLICATIONS

"influence of chloride, water, and organic solvents on the physical properties of ionic liquids" Seddon et al. (2000).*
European Search Report in corresponding application, dated Jun. 28, 2011.

* cited by examiner

*Primary Examiner* — Austin Murata
(74) *Attorney, Agent, or Firm* — Holtz, Holtz, Goodman & Chick PC

(57) ABSTRACT

Disclosed is a method of manufacturing an electrochromic display element having improved durability. Specifically disclosed is a method of manufacturing a display element containing opposed electrodes and a porous layer which is arranged between the opposed electrodes and containing a metal oxide and an electrochromic dye supported on the metal oxide. The method contains the step of applying plural kinds of inks to the porous layer by an inkjet apparatus, wherein the inks are capable of uniformizing the amount of the electrochromic dye supported on the porous layer containing the metal oxide in one pixel of the display element.

5 Claims, No Drawings

METHOD OF MANUFACTURING DISPLAY ELEMENT

This application is the United States national phase application of International Application PCT/JP2008/058357 filed May 1, 2008.

TECHNICAL FIELD

The present invention relates to a method of manufacturing a novel electrochemical display element which enables multicolor display with a one-layer structure of the display element.

BACKGROUND OF THE INVENTION

In recent years, along with the increase in the operating speed of personal computers, the spread of network infrastructure, the markedly increased capacity of data storage, and the decrease in price, a further opportunity is increasing in which information such as text and images which have traditionally been supplied in the form of paper printed matter is now acquired and read as convenient electronic information.

Employed as such electronic information reading means are conventional liquid crystal displays as well as CRTs, and in recent years, emissive displays such as organic EL displays are drawn attention. Particularly, when electronic information is in the form of text, it is necessary for an operator to watch the browsing means for a relatively long period of time, which is not a human-conscious operation. Generally, it is known that emissive displays exhibit the following disadvantages: screen flickering results in eye fatigue; display devices are not portable; reading posture is limited; operators tend to gaze at a still screen; and reading over an extended period of time results in an increase of electric power consumption.

Known as display means to overcome such disadvantages are reflective displays (having a memory effect) which do not consume power for maintaining images since these displays use external light. However, due to the following reasons, it is difficult to mention that sufficient performance has been achieved.

Namely, displays employing polarized plates such as reflective liquid crystals exhibit reflectance as low as approximately 40 percent, resulting in having a problem in displaying white. Further, the production methods employed to prepare constituting members are not simple. Polymer dispersion type liquid crystal displays require relatively high voltage, in addition, since only the difference in the refractive index among organic materials is utilized, the resulting images do not exhibit sufficient contrast. Polymer network type liquid crystal displays result in problems in which a high voltage is required and in order to enhance memory functions, complicated TFT circuits are required. Display elements based on an electrophoretic method necessitate voltage as high as at least 10 V, and durability problems may occur due to coagulation of electrophoretic particles. In order to use one of the above methods for a color display, a method to use a color filter or a method to used a pattern color have been known. In the former method, it is difficult to obtain a bright white display, in principal, due to the coloration of the color filter, and the latter method has a problem in that a dark black color cannot be obtained due to the use of a pattern color.

As one of the methods which enable a full color display, an electrochromic method has been know, which is a promising method which can be driven at a voltage of 3V or less, and enables a display of bight white which has been difficult in the abovementioned methods. In order to obtain higher contrast by an electrochromic method, a method to further adsorb an electrochromic dye to a semiconductor porous electrode by an inkjet method has been known (for example, refer to Patent Documents 1). In this method, it is possible to fix an electrochromic dye in the semiconductor porous electrode, however, when the display device is repeatedly driven, a contrast change occurs, and the durability of the display device is deteriorated.

Patent Document 1 Published Japanese Translation of PCT International Publication No. 2004-537743

DISCLOSURE OF THE INVENTION

Problems to be Solved by the Invention

In view of the foregoing problems, the present invention was achieved. An object of the present invention is to provide a method of manufacturing a display device of an electrochromic mode improved in durability.

Method to Solve the Problems

The above object of the present invention is achieved by the following structures.
1. A method of manufacturing a display element comprising opposed electrodes having therebetween a porous layer comprising an electrochromic dye and a metal oxide supporting the electrochromic dye, the method comprising the step of:
applying plural kinds of inks to the porous layer comprising the metal oxide in one pixel of the display element using an inkjet apparatus, the inks having a function to uniformize an amount of the electrochromic dye supported by the metal oxide.
2. The method of Item 1, wherein at least one of the plural kinds of inks comprises the electrochromic dye.
3. The method of Item 1 or 2, wherein at least one of the plural kinds of inks has a function to desorb the electrochromic dye from the porous layer comprising the metal oxide and to dissolve the electrochromic dye in the ink to uniformly diffuse the electrochromic dye in the pixel.
4. The method of any one of Items 1 to 3, wherein at least one of the plural kinds of inks has a function to readsorb the electrochromic dye to the porous layer comprising the metal oxide.
5. The method of any one of Items 1 to 4, wherein at least one of the plural kinds of inks has a function to disturb adsorption of the electrochromic dye to the porous layer comprising the metal oxide.
6. The method of any one of Items 1 to 5, wherein the electrochromic dye is at least one compound selected from the group consisting of a compound represented by Formula (A), a compound represented by Formula (B) and a metal complex having a ligand represented by Formula (C):

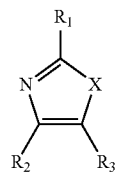

Formula (A)

wherein $R_1$ represents a substituted or nonsubstituted aryl group; $R_2$ and $R_3$ each represent a hydrogen atom or a substituent; and X represents >N—R$_4$, an oxygen atom or a sulfur atom, wherein R$_4$ represent a hydrogen atom or a substituent,

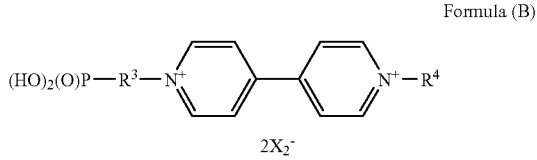

Formula (B)

wherein
R$^3$ represents
—(CH$_2$)$_m$— (wherein m is 0 or an integer of 1-10),
an arylene group or a heteroarylene group each having not more than 14 carbon atoms,
a branched alkylene group, an alkenylene group, an aralkylene group or a cycloalkylene group each having not more than 10 carbon atoms, provided that the arylene group, the heteroarylene group, the branched alkylene group, the branched alkenylene group, and the cycloalkylene group may arbitrary have a —P(O)(OH)$_2$ group through a —(CH$_2$)$_n$— group or may be arbitrary substituted, wherein n represents 0 or an integer of 1-10;
R$_4$ represents a group represented by R$_5$ or R$_6$, wherein
R$_5$ represents —(CH$_2$)$_p$— (wherein p is 0 or an integer of 1-10),
R$_6$ represents
a —P(O)(OH)$_2$ group,
an aryl group or a heteroaryl group each having not more than 14 carbon atoms,
a branched alkyl group, an alkenyl group or a cycloalkyl group each having not more than 10 carbon atoms, or
a hydrogen atom; and
X$_2^-$ represent an ion neutralizing a charge, and

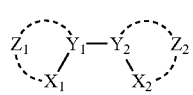

Formula (C)

wherein X$_1$ and X$_2$ each represent —NR$_1$'—, —S— or —O—, wherein R$_1$' represents a hydrogen atom or a bond to form a double bond with a neighboring atom; Y$_1$ and Y$_2$ each represents CR$_2$' or N, wherein R$_2$' represents a hydrogen atom or a bond to form a double bond with a neighboring atom; Z$_1$ represents a group of atoms to form a heterocycle together with X$_1$ and Y$_1$; Z$_2$ represents a group of atoms to form a heterocycle together with X$_2$ and Y$_2$; and the heterocycle formed by Z$_1$, X$_1$ and Y$_1$, and the heterocycle formed by Z$_2$, X$_2$ and Y$_2$ each may have a substituent or may form a condensed ring.

7. The method of any one of Items 1 to 6, wherein the display element is manufactured by planarly arranging display regions having substantially different color hues from each other by separately applying the electrochromic dyes using an inkjet method, and performs color display.

8. The method of Item 7, wherein the display element comprises a silver salt electrolyte and a white scattering material between the opposed electrodes and performs a multicolor display of three or more colors containing a black display, a white display and a display of a color other than black by a driving operation using the opposed electrodes.

Effect of the Invention

According to the present invention, a method of manufacturing a display device of an electrochromic mode improved in durability can be provided.

The best modes to carry out the present invention will be explained in detail below.

The present invention provides a method of manufacturing a display element containing opposed electrodes having therebetween a porous layer containing an electrochromic dye (hereafter, abbreviated as an EC dye) and a metal oxide supporting the electrochromic dye, the method comprising the step of: applying plural kinds of inks to the porous layer comprising the metal oxide in one pixel of the display element using an inkjet apparatus, the inks having a function to uniformize an amount of the electrochromic dye supported by the metal oxide.

In the conventional method, an EC dye is supported in a porous layer containing metal oxide by ejecting an ink containing the EC dye on the porous layer by an inkjet apparatus, followed by evaporating the solvent contained in the ink. However, in this method, the diffusion of the solvent of the ink and the motion of the EC dye to be supported on the metal oxide are conflicting. Therefore, it is difficult to support the EC dye uniformly in the planar direction and in the cross-sectional direction. As the result, the light emission from the EC dye is concentrated at the portion where the amount of supported EC dye is large and, when the display element is repeatedly driven, deterioration of the durability begins at that portion, whereby unevenness in the image is observed in the display element. The aforementioned unevenness in the image can be reduced by employing the construction of the present invention, namely, the plural kinds of inks having a function to improve the uniformity are ejected.

Examples of a method to improve the uniformity of on the image include: desorbing the supported EC dye from the porous layer; redissolving the EC dye to spread uniformly in the pixel; and supporting the EC dye again, and, further specifically, the examples include: changing the order to apply the inks; changing the content of the solvent in the ink; changing the acidity or the basicity of the ink; adding a compound which is more easily supported in the porous layer; and changing the position to apply the ink.

The details of each constituting element of the display element according to the present invention will be explained below.

[Basic Constitution of Display Element]

In the display element according to the present invention, a display section is provided with a pair of opposing electrodes. On Electrode 1 which is one of the opposing electrodes closer to the display section, a transparent electrode, for example, an ITO electrode is formed, and on Electrode 2, a conductive electrode is formed. Between Electrodes 1 and 2, an electrochromic dye is held, and, by applying a positive or negative voltage between the opposed electrodes, the coloring condition of the electrochromic dye is changed, and an image is displayed.

[Porous Electrode Containing Metal Oxide]

The display element according to the present invention is characterized in that a porous electrode containing a metal oxide is employed.

Examples of a metal oxide constituting the porous electrode according to the present invention include titanium oxide, silicon oxide, zinc oxide, tin oxide, Sn-doped indium oxide (ITO), antimony-doped tin oxide (ATO), fluorine-doped tin oxide (FTO) and aluminum-doped zinc oxide, and a mixture thereof.

The porous electrode can be formed by binding or contacting a plurality of particles of the metal oxide described above. The average particle diameter of the metal oxide particles is preferably from 5 nm to 10 μm, and more preferably from 20 nm to 1 μm. The specific surface area of the metal oxide particles, based on the simple BET method, is preferably from $1\times10^{-3}$ to $1\times10^{2}$ m²/g and more preferably from $1\times10^{-2}$ to 10 m²/g. The metal oxide particles may be in any form, such as an irregular form, needle form or a spherical form.

As a method for forming or binding the metal oxide particles, a sol-gel method or a sintering method can be employed. Examples thereof include, for instance, a method described in 1) Journal of the Ceramic Society of Japan 102, 2, p 200 (1994), 2) Yogyo-kyokai-shi 90 [4] p 157, and 3) J. of Non-Cryst. Solids 82, 400 (1986). There can be also employed a method for preparing a porous electrode which coats, on a substrate, a dispersion solution in which titanium oxide dendrimer particles prepared by a gas phase method are dispersed, followed by drying at 120 to around 150° C. to remove the solvent. The metal oxide particles are preferably in the binding state, and it is preferred that such metal oxide particles have a durability of not less than 0.1 g, and preferably not less than 1 g, the durability measured according to a continuous weight load type surface meter (for example, a scratch meter).

The expression "porous" in the invention refers to a penetrated state in which, when potential difference between the opposed electrodes is applied, a dissolution reaction or a precipitation reaction of silver can be conducted, and the ion species can move through the porous electrode.

[Electrochromic Dye]

As an electrochromic dye according to the present invention, any kind of dye may be employed as long as it can be supported in the aforementioned porous layer containing the metal oxide.

As an electrochromic dye according to the present invention, preferably, at least one compound selected from the group consisting of a compound represented by Formula (A), a compound represented by Formula (B) and a metal complex having a ligand represented by Formula (C) is cited.

Hereafter, the compound represented by the above-mentioned Formula (A), (B), and (C) is described one by one.

The electrochromic compound which is represented by abovementioned Formula (A) according to the present invention will be described, first.

In the formula, $R_1$ represents a substituted or nonsubstituted aryl group; $R_2$ and $R_3$ each represent a hydrogen atom or a substituent; and X represents >N—$R_4$, an oxygen atom or a sulfur atom, wherein $R_4$ represent a hydrogen atom or a substituent.

In Formula (A), $R_1$ represents a substituted or nonsubstituted aryl group; $R_2$ and $R_3$ each represent a hydrogen atom or a substituent. Specific examples of a substituent represented by $R_1$, $R_2$ and $R_3$ include: an alkyl group (for example, a methyl group, an ethyl group, a propyl group, an isopropyl group, a tert-butyl, a pentyl group and a hexyl group), a cycloalkyl group (for example, a cyclohexyl group and a cyclopentyl group), and an alkenyl group, a cycloalkenyl group, an alkynyl group (for example, a propargyl group), a glycidyl group, an acrylate group, a methacrylate group, an aromatic group (for example, a phenyl group, a naphthyl group and an anthracenyl group), a heterocycle group (for example, a pyridyl group, a thiazolyl group, an oxazolyl group, an imidazolyl group, a furyl group, a pyrrolyl group, a pyrazinyl group, a pyrimidinyl group, a pyridazinyl group, a selenazolyl group, a thryhorany group, a piperizinyl group, a pyrazolyl group and a tetrazolyl group) an alkoxy group (for example, a methoxy group, an ethoxy group, a propyloxy group, a pentyloxy group, a cyclopentyloxy group, a hexyloxy group and a cyclohexyloxy group), an aryloxy group (for example, a phenoxy group), an alkoxycarbonyl group (for example, a methyloxycarbonyl group, an ethyloxycarbonyl group and a butyloxycarbonyl group), an aryloxycarbonyl group (for example, a phenyloxycarbonyl group), a sulfonamide group (for example, a methanesulfonamide group, an ethanesulfonamide group, a butanesulfonamide group, a hexane sulfonamide group, a cyclohexane sulfonamide group and a benzenesulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group and 2-pyridylaminosulfonyl group), a urethane group (for example, a methylureido group, an ethylureido group, and a pentylureido group, a cyclohexylureido group, a phenylureido group and 2-pyridylureido group), an acyl group (for example, an acetyl group, a propionyl group, a butanoyl group, and a hexanoyl group, a cyclohexanoyl group, a benzoyl and a pyridinoyl group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, a phenylaminocarbonyl group and a 2-pyridylaminocarbonyl group), an acylamino group (for example, an acetylamino group, a benzoylamino group and a methylureido group), an amide group (for example, an acetamide group, a propioneamide group, a butaneamide group, a hexaneamide group and a benzamide group), a sulfonyl group (for example, a methylsulfonyl group, an ethylsulfonyl group, a butylsulfonyl group, a cyclohexylsulfonyl group, a phenylsulfonyl group and a 2-pyridyl sulfonyl group), a sulfonamide group (for example, a methylsulfonamide group, an octylsulfonamide group, a phenylsulfonamide group and a naphthylsulfonamide group), an amino group (for example, an amino group, an ethylamino group, a dimethylamino group, a butylamino group, a cyclopentylamino group, an anilino group and 2-pyridylamino group), a halogen atom (for example, a chlorine atom, a bromine atom and an iodine atom), a cyano group, a nitro group, a sulfo group, a carboxyl group, a hydroxyl group, a phosphono group (for example, a phosphonoethyl group, a phosphonopropyl group and a phosphonooxyethyl group) and an oxamoyl group. These groups may further be substituted with these groups.

$R_1$ is a substituted or unsubstituted aryl group and preferably a substituted or unsubstituted phenyl group and further preferably a substituted or unsubstituted 2-hydroxyphenyl group or 4-hydroxyphenyl group.

$R_2$ and $R_3$ each are preferably an alkyl group, a cycloalkyl group, an aromatic group or a heterocycle group, more preferably, one of $R_2$ and $R_3$ is a phenyl group and the other is an alkyl group and further more preferably, both of $R_2$ and $R_3$ are a phenyl group.

X is preferably >N—$R_4$. $R_4$ is preferably a hydrogen atom, an alkyl group, an aromatic group, a heterocycle group or an acyl group and more preferably a hydrogen atom, an alkyl group having 1 to 10 carbon atoms, an aryl group having 5 to 10 carbon atoms or an acyl group.

Example of a concrete compound of an electrochromic compound represented by Formula (A) will be shown below, however, the present invention is not limited to these exemplified compounds.

A-1
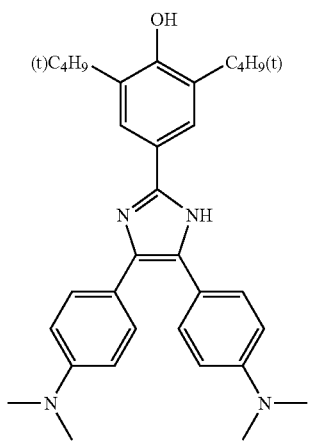
A-2
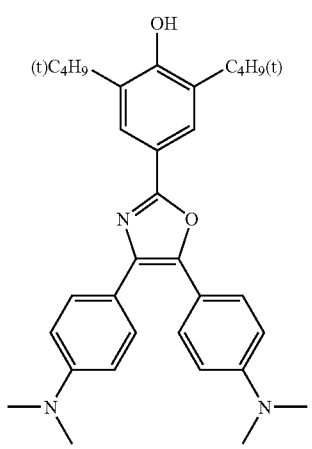
A-3
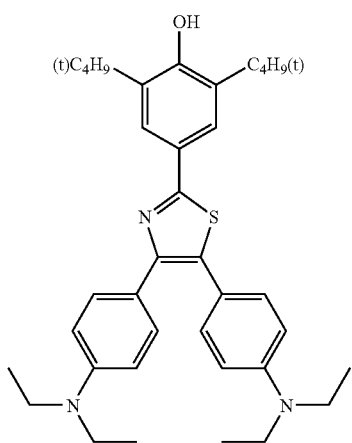
A-4
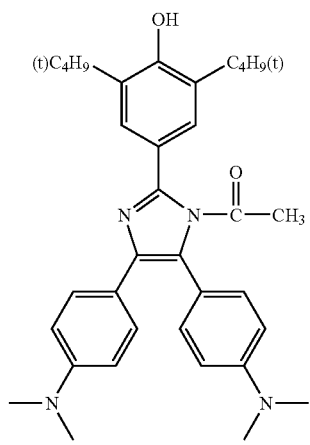
A-5
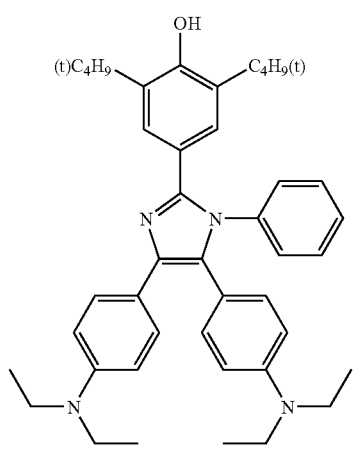
A-6
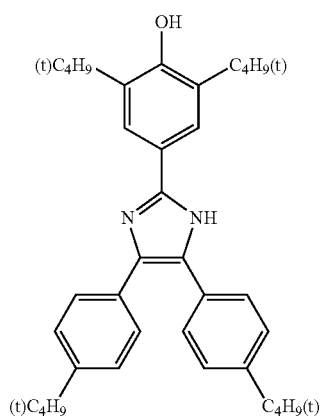

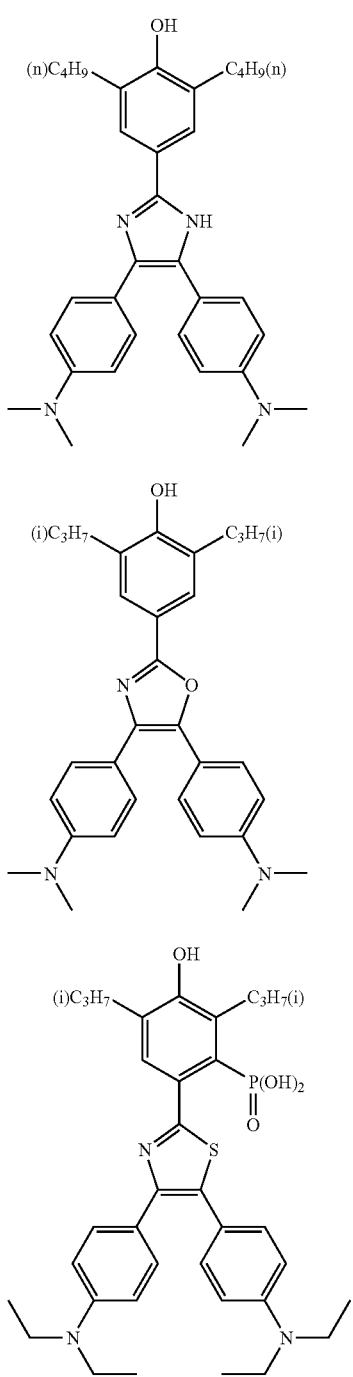
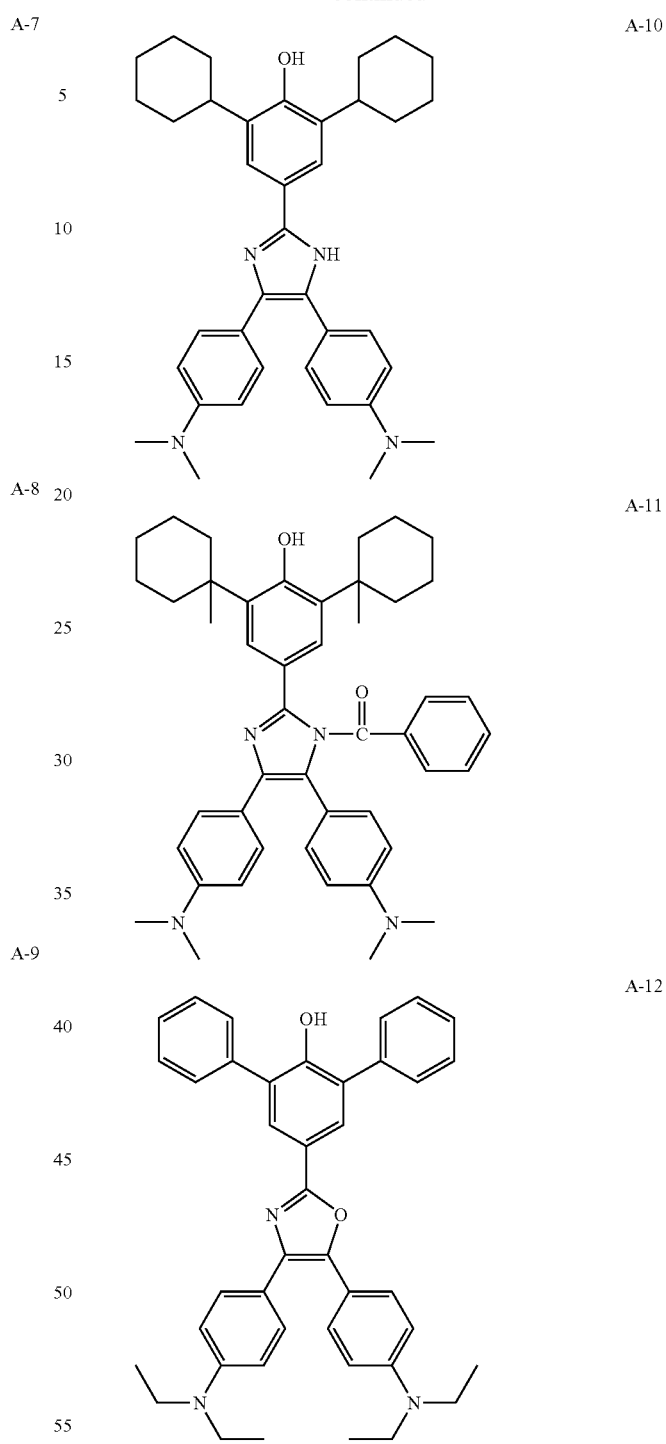

A-13 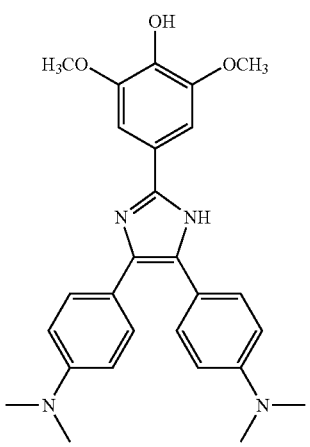
A-14 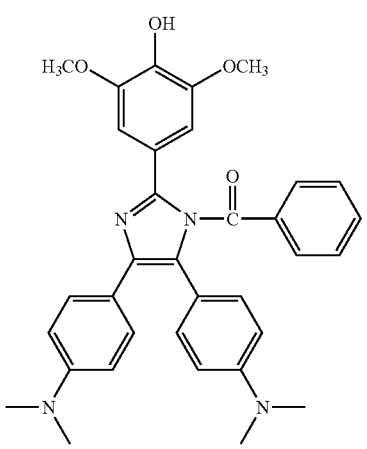
A-15 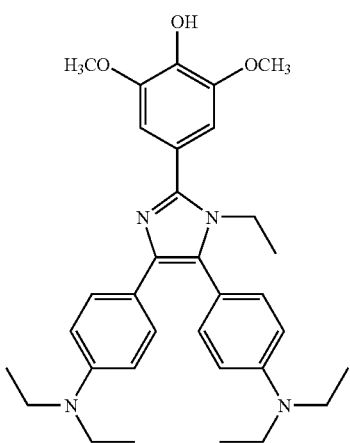
A-16 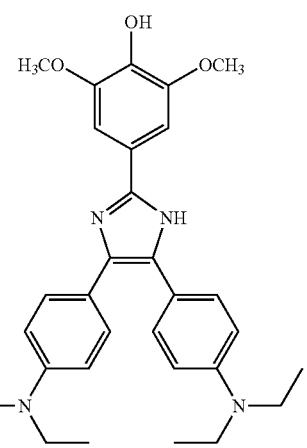
A-17 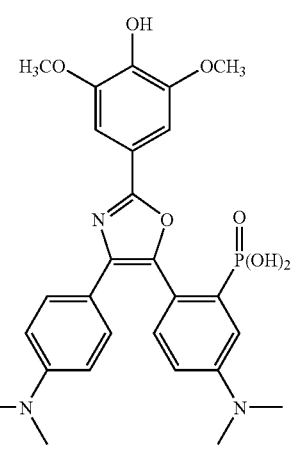
A-18 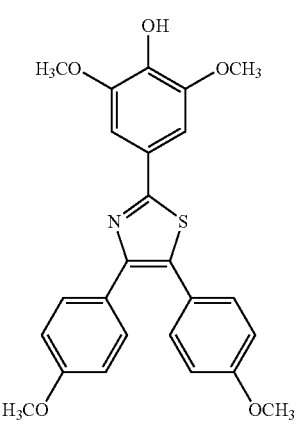

A-19
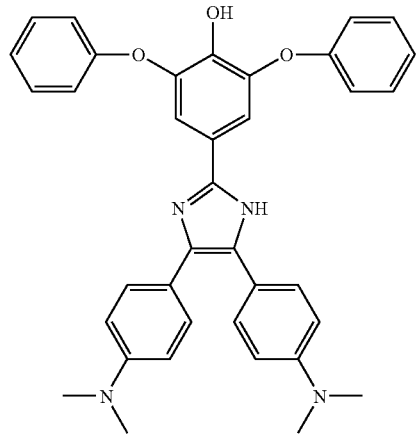
A-20
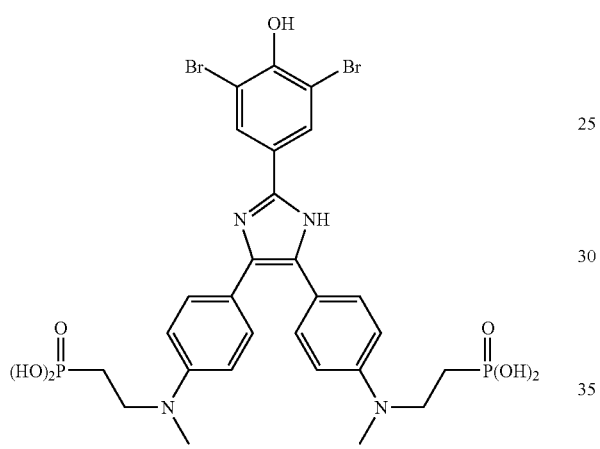
A-21
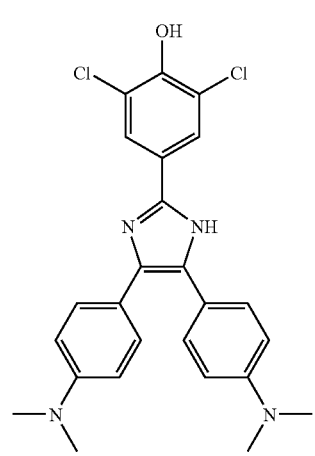
A-22
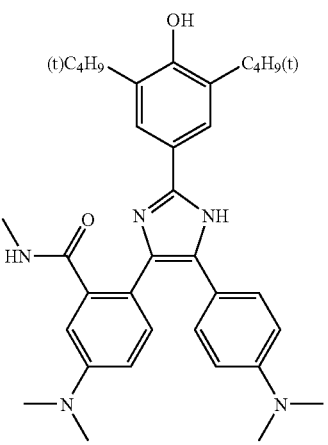
A-23
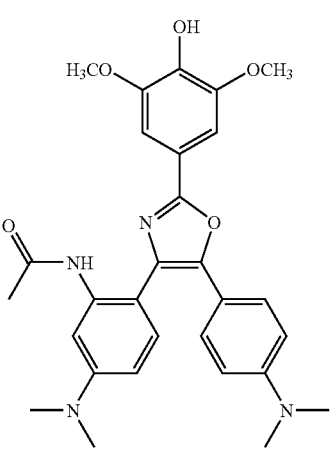
A-24
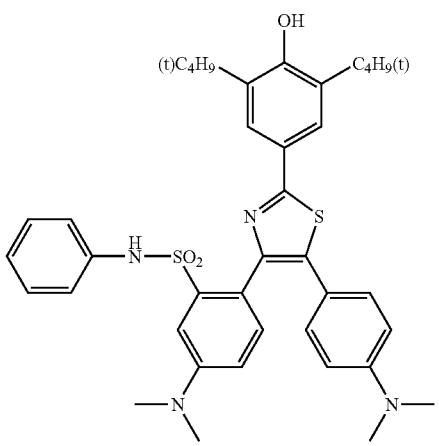

A-25
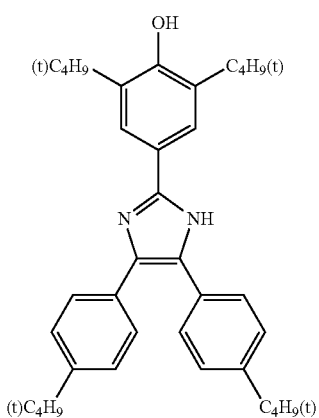
A-26
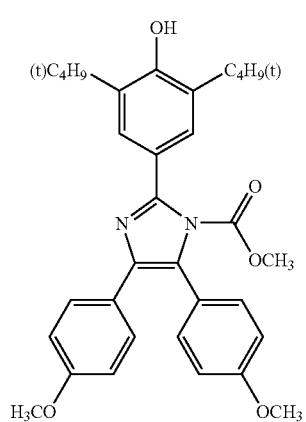
A-27
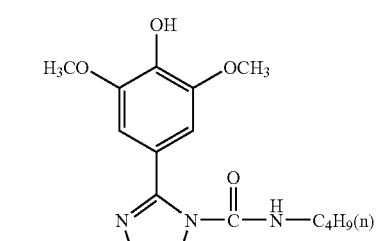
A-28
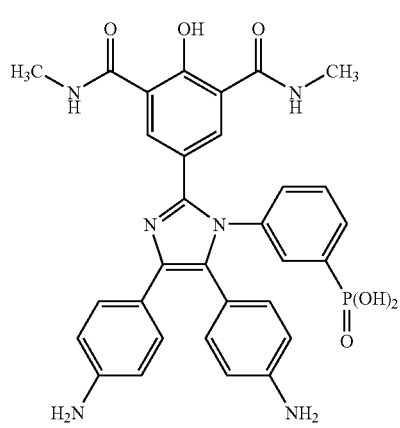
A-29
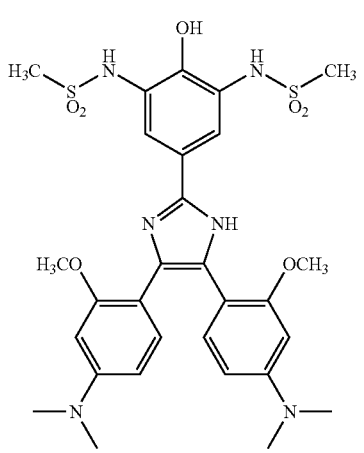
A-30
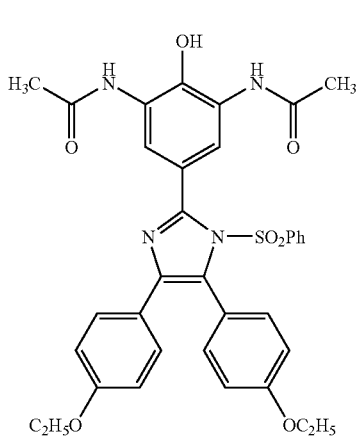
A-31
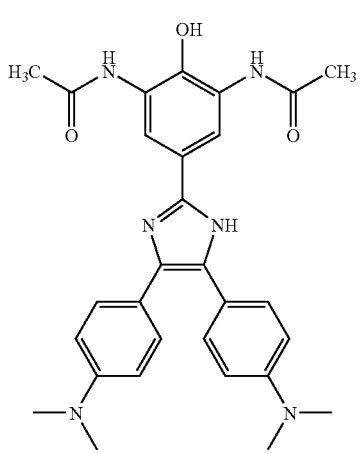

A-32 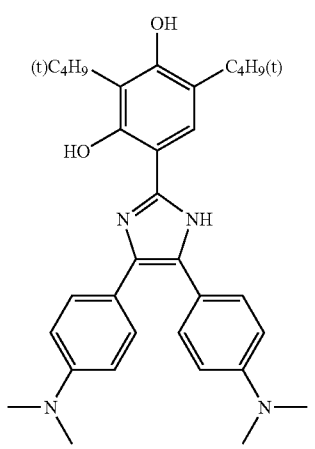
A-33 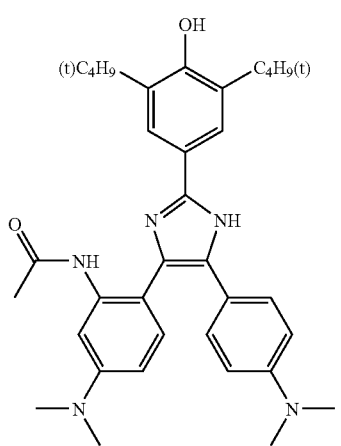
A-34 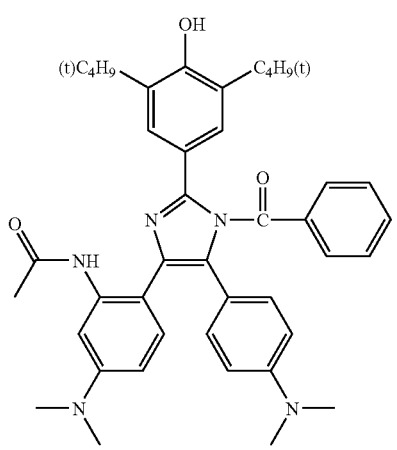
A-35 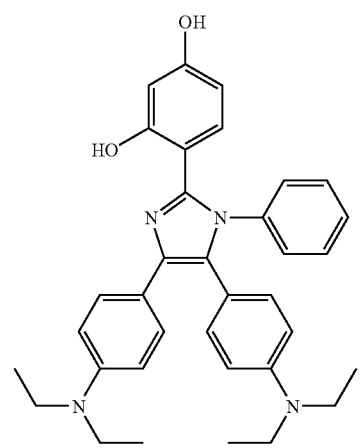
A-36 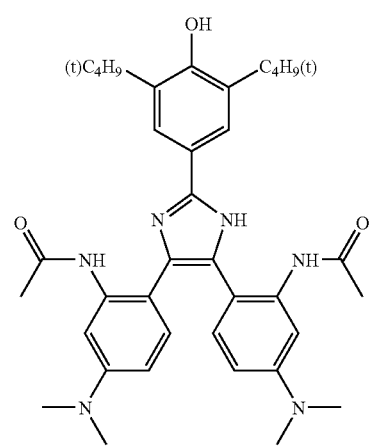
A-37 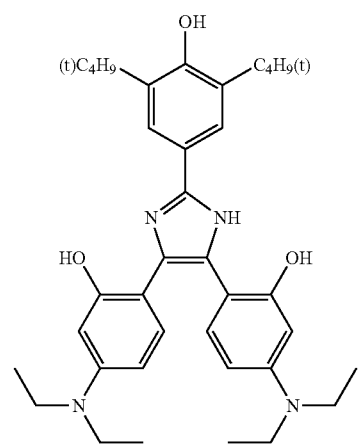

-continued
A-38
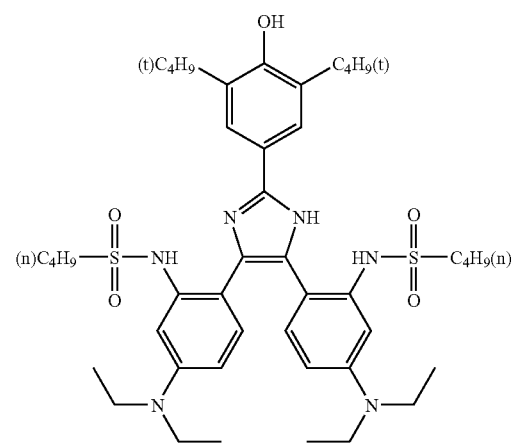
A-39
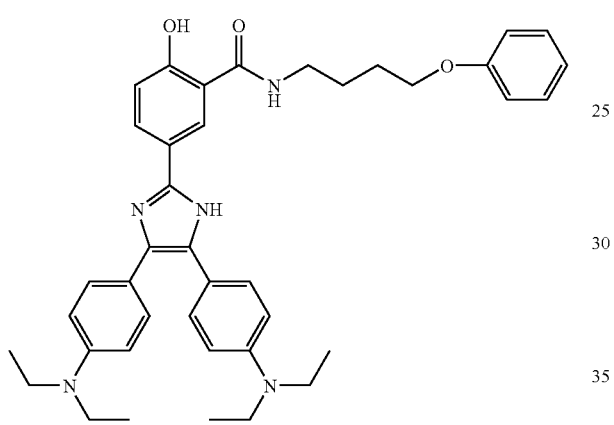
A-40
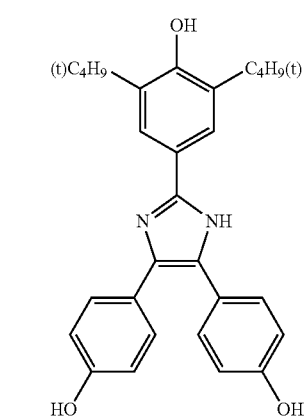
A-41
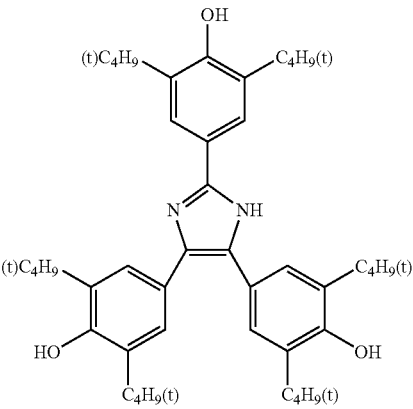
A-42
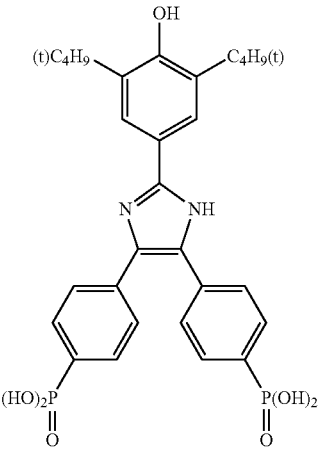
A-43
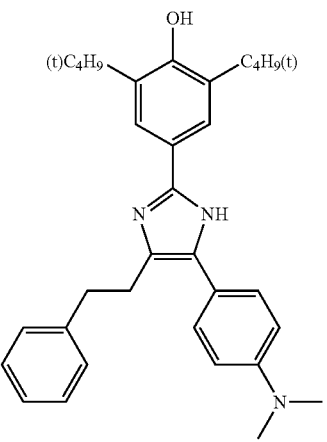

A-44 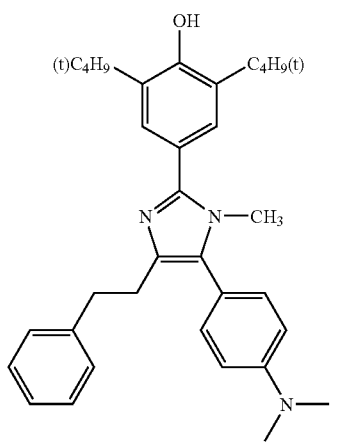
A-45 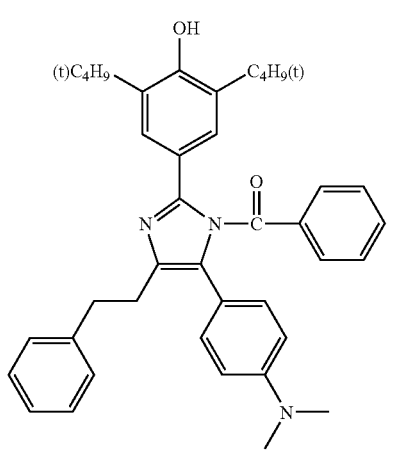
A-46 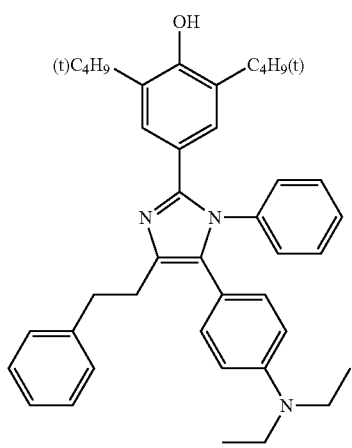
A-47 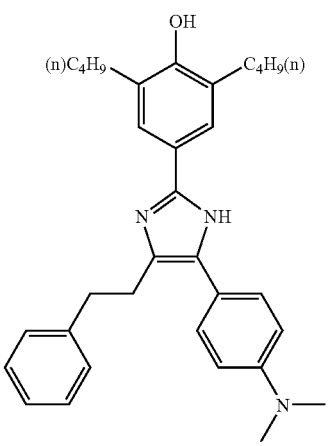
A-48 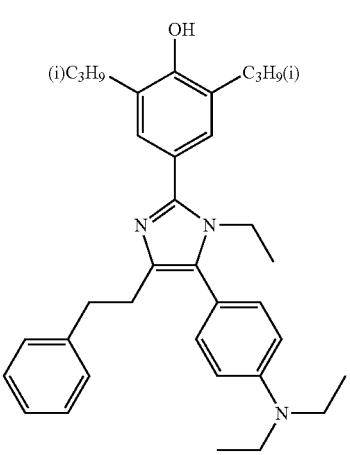
A-49 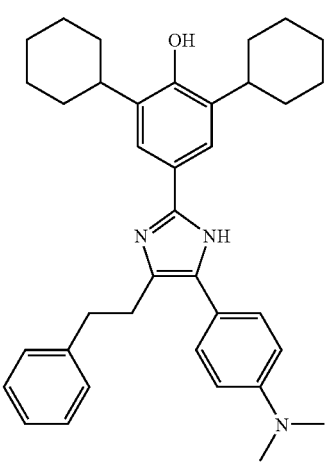

-continued
A-50
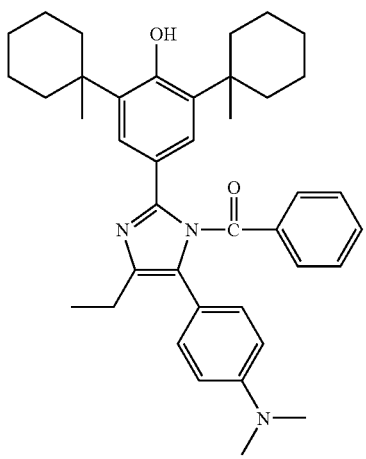
A-51
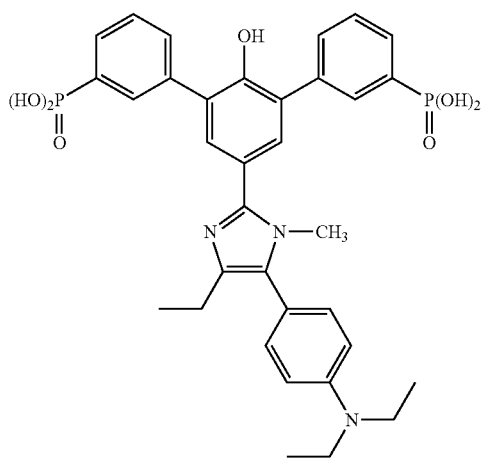
A-52
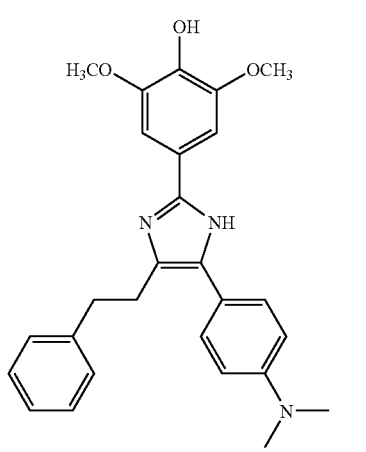
A-53
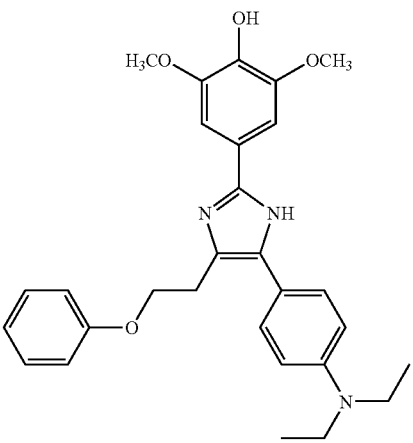
A-54
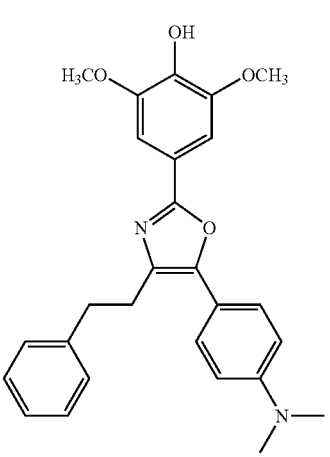
A-55
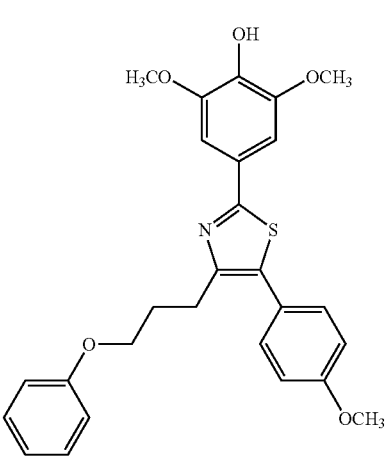

A-56
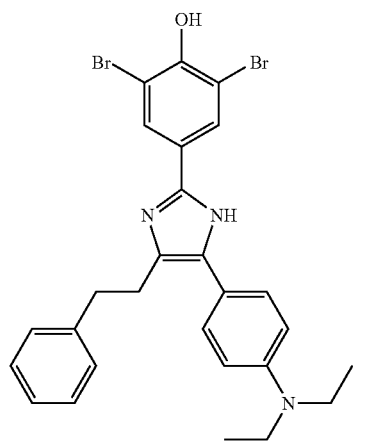
A-57
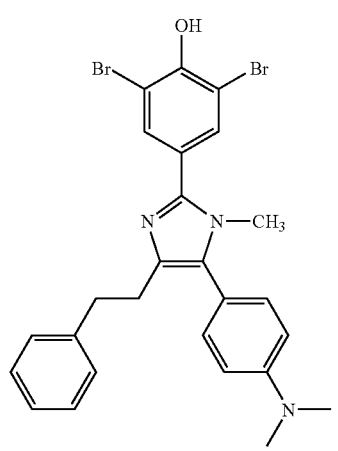
A-58
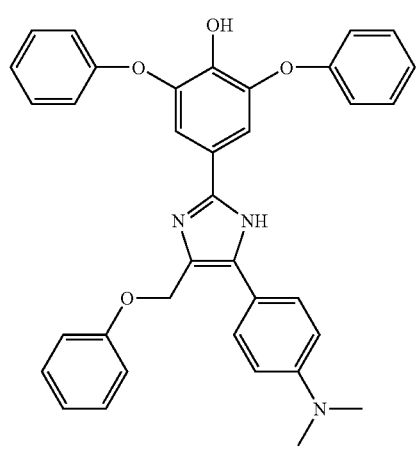
A-59
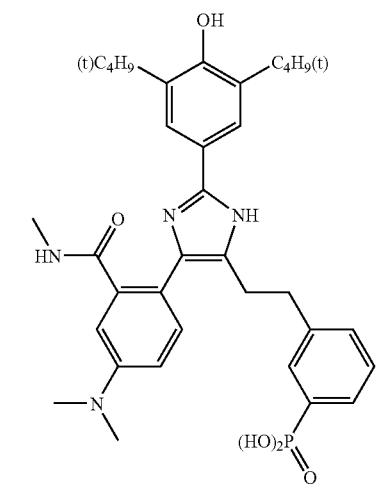
A-60
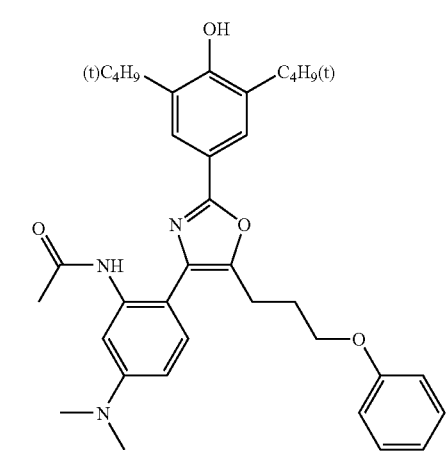
A-61
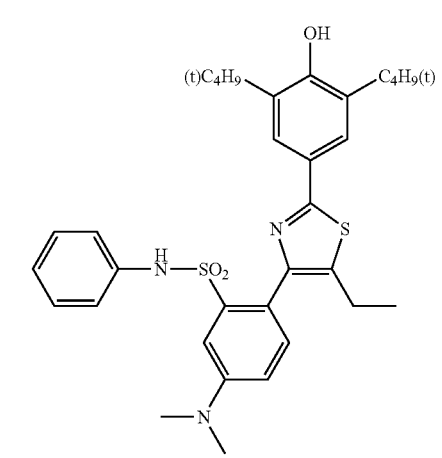

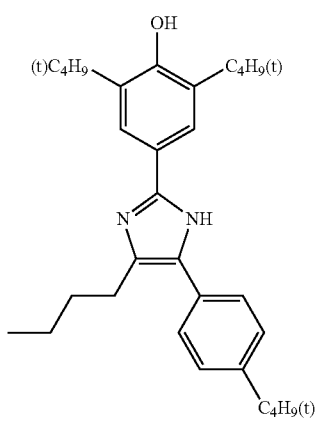
A-62
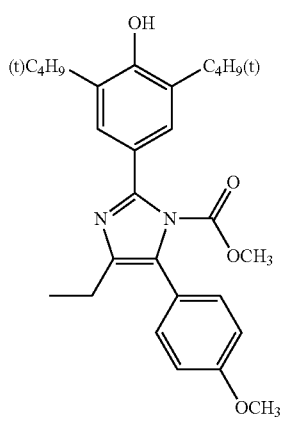
A-63
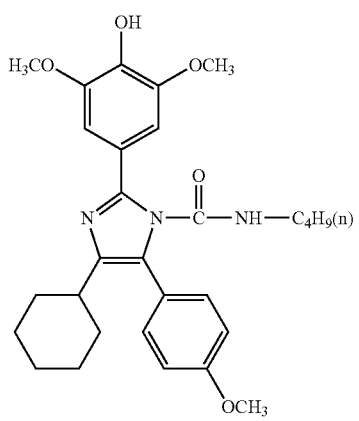
A-64
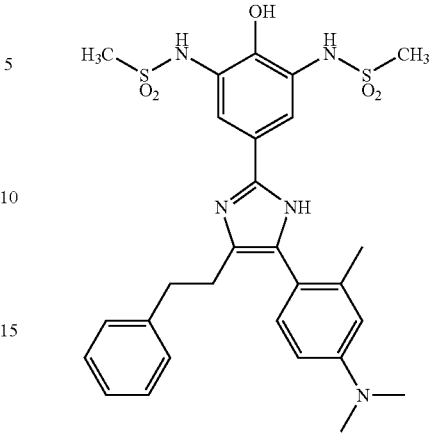
A-65
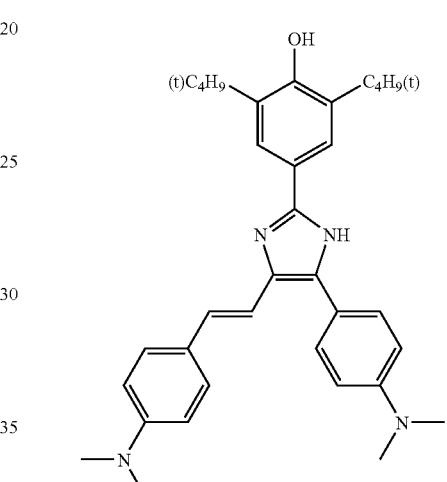
A-66
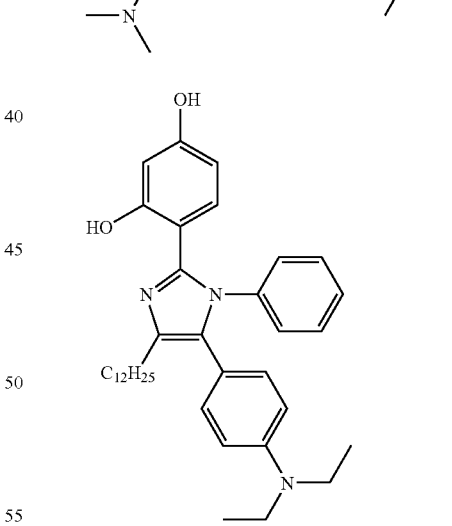
A-67

-continued
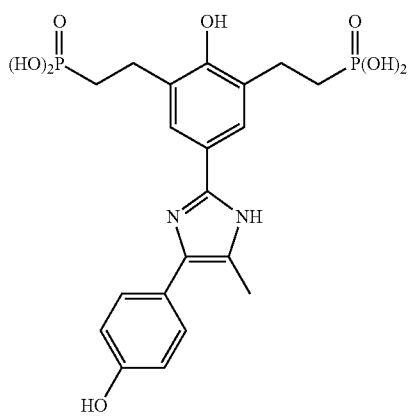
A-68
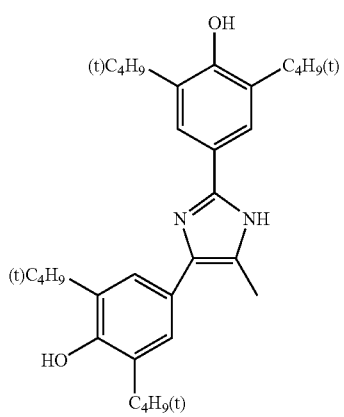
A-69
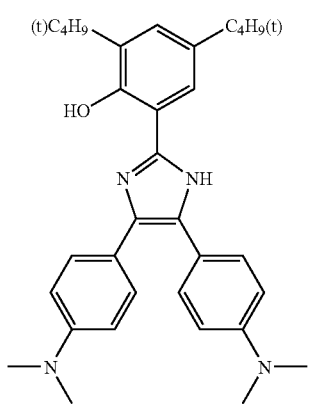
A-70
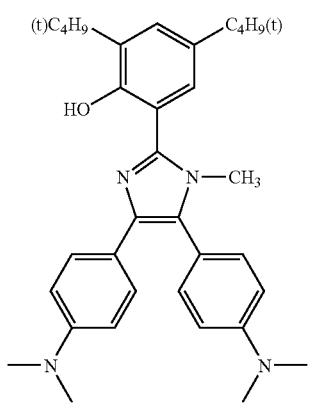
A-71
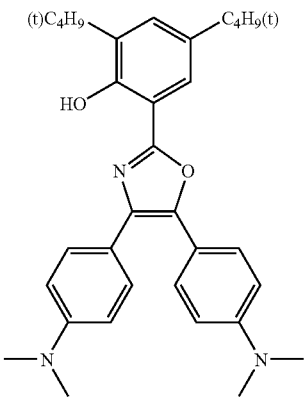
A-72
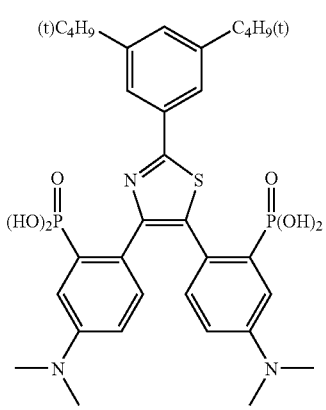
A-73
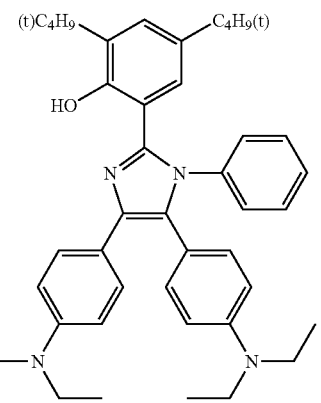
A-74
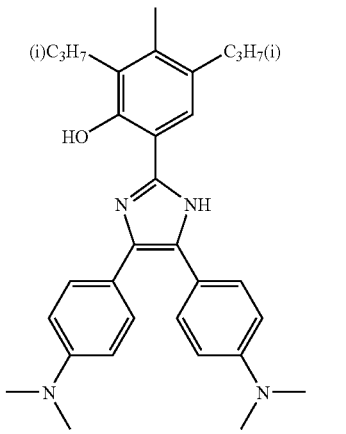
A-75

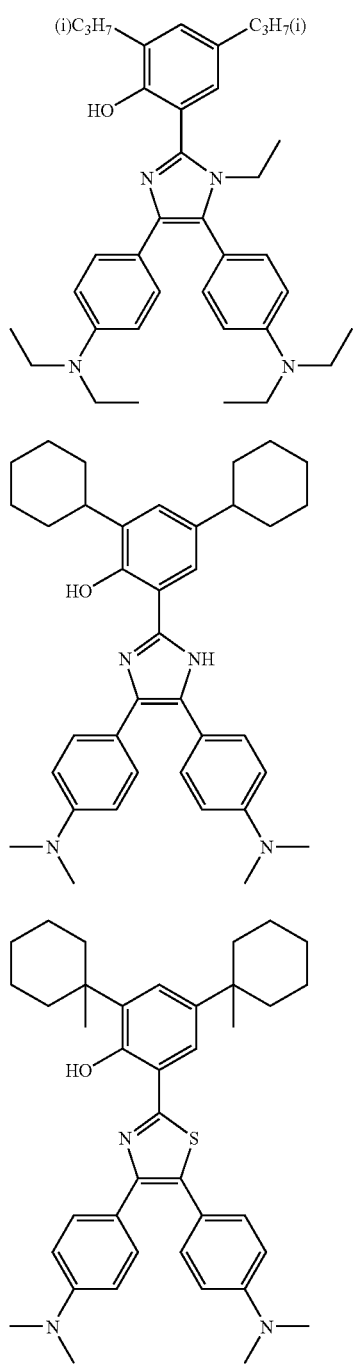
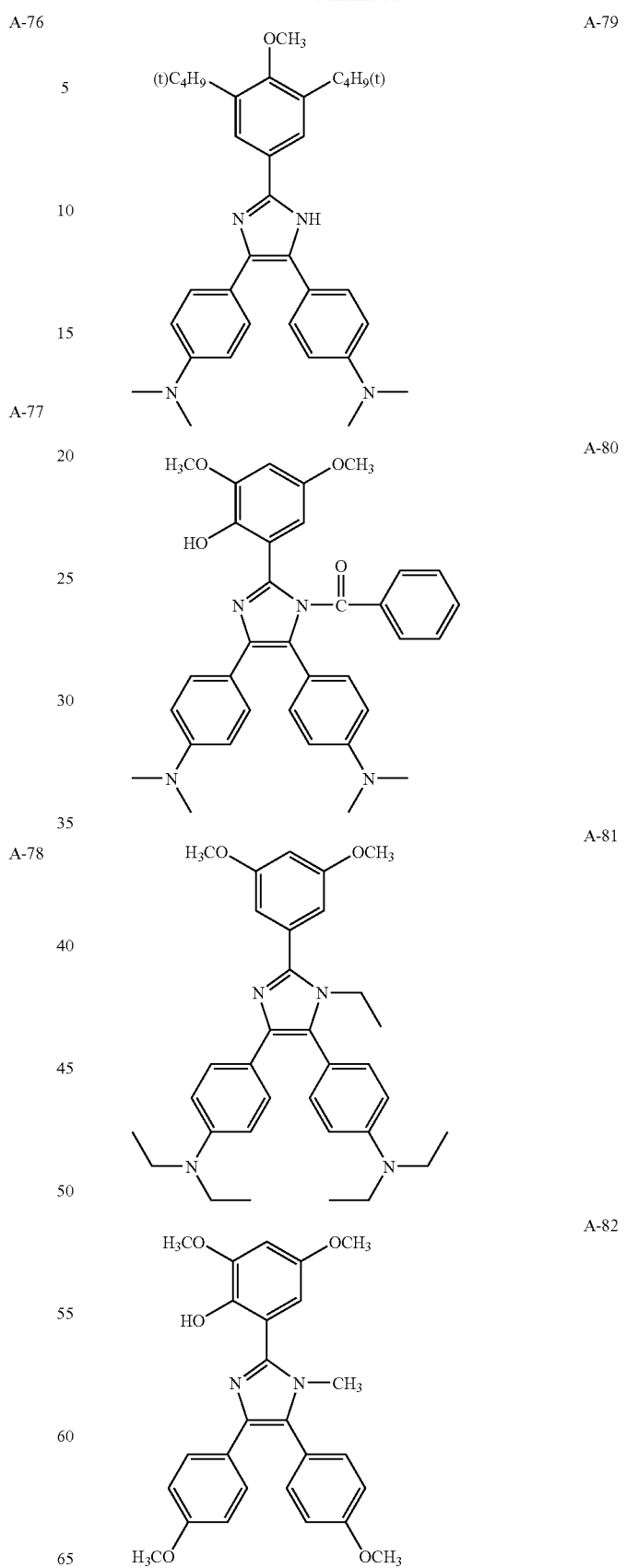

A-83
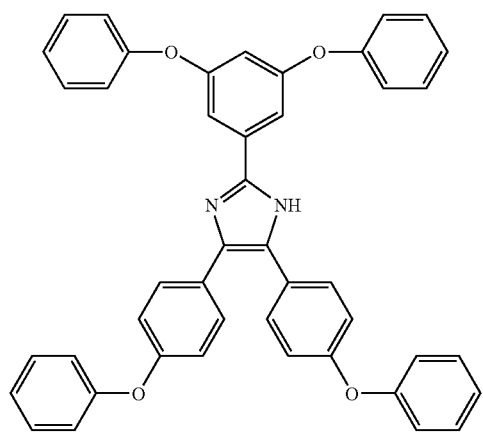
A-84
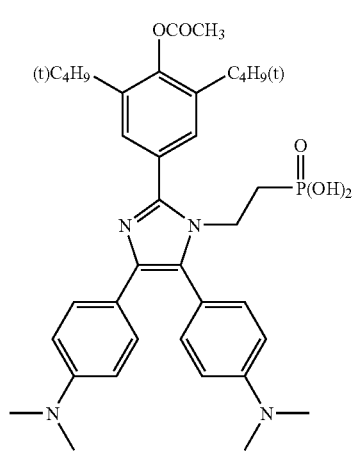
A-85
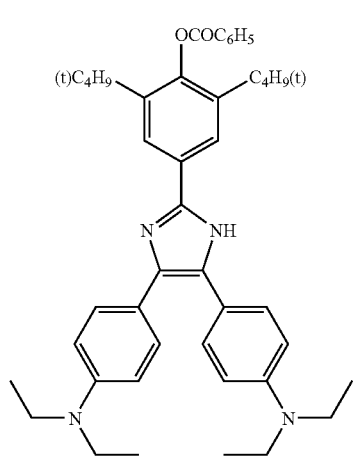
A-86
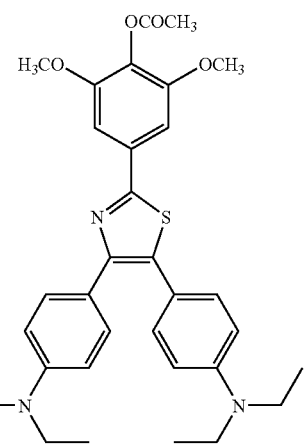
A-87
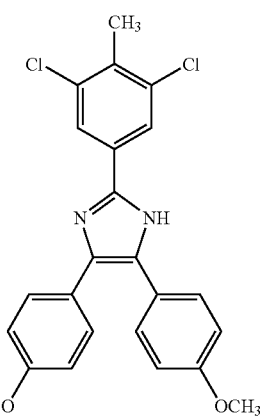
A-88
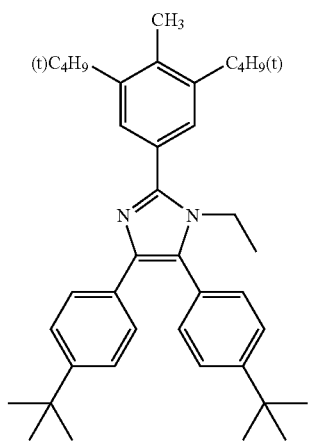

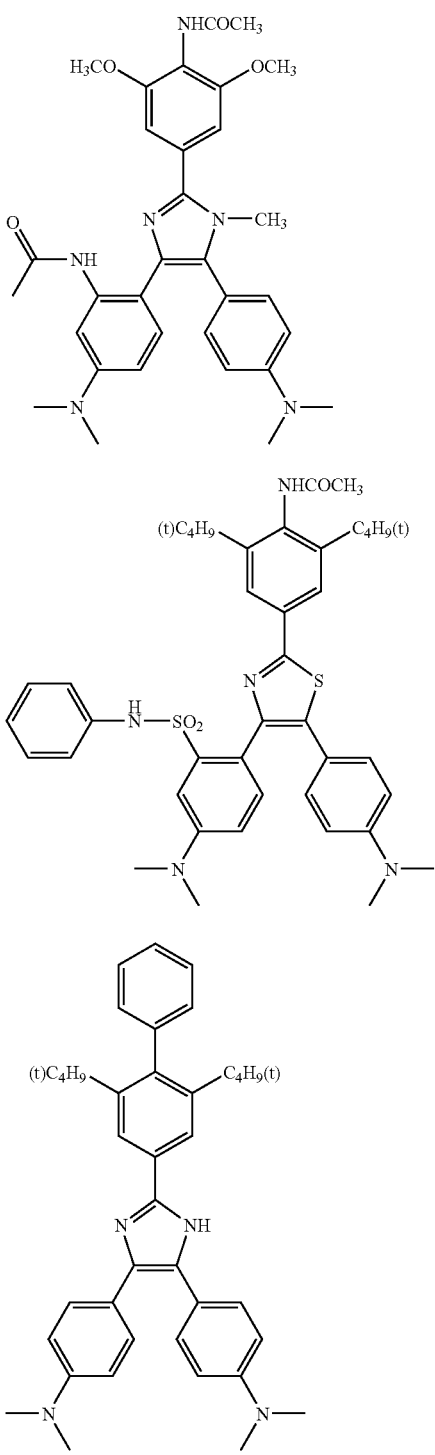
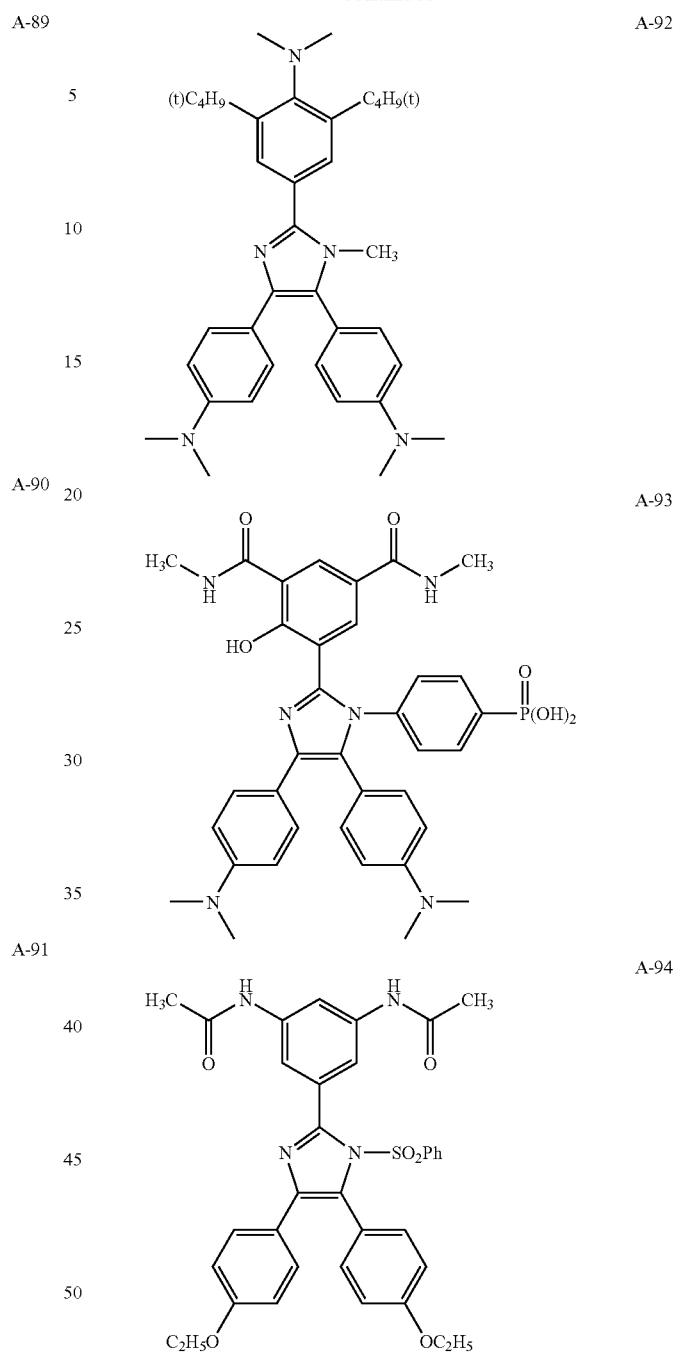

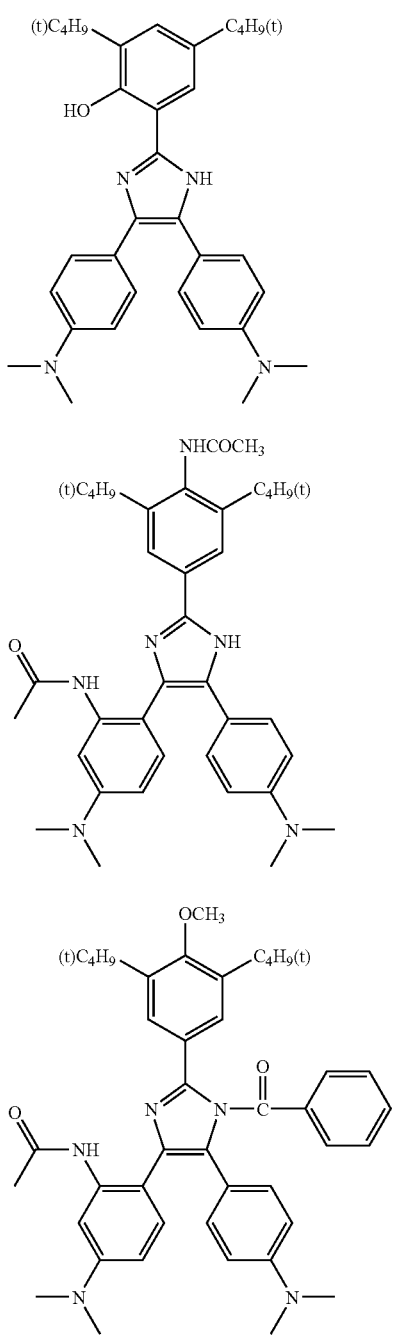
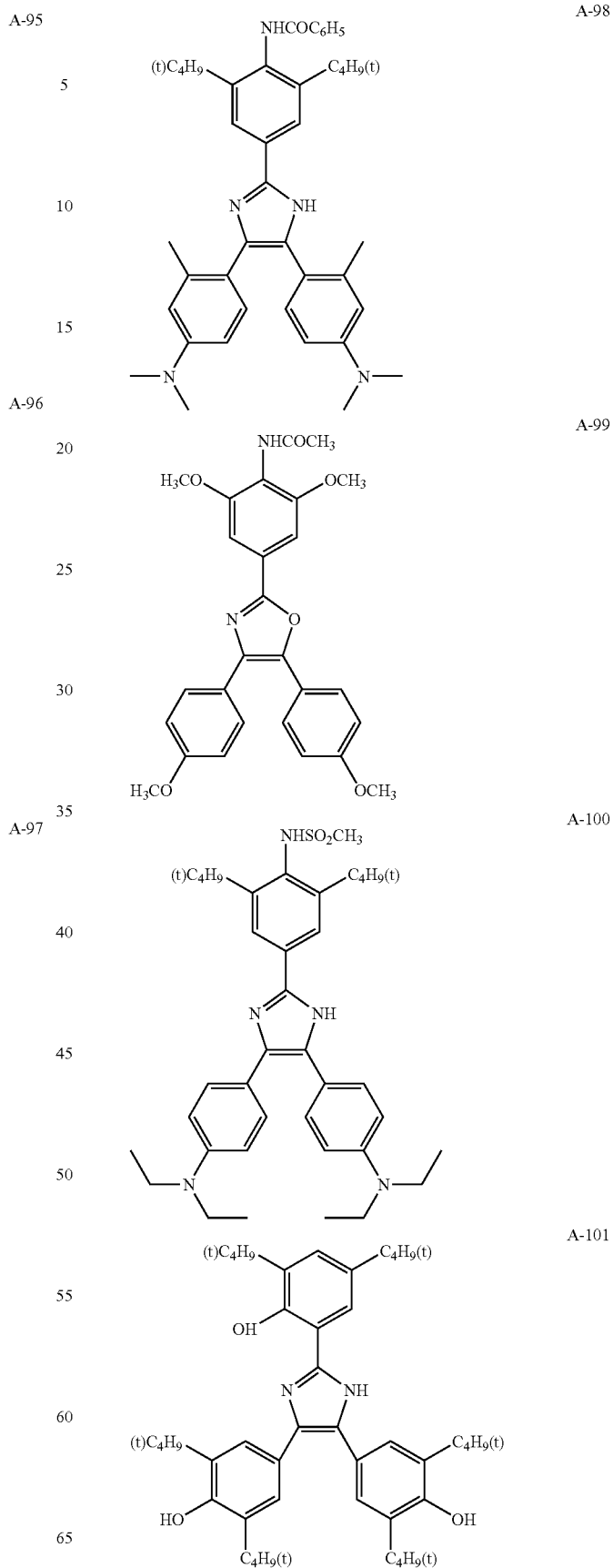

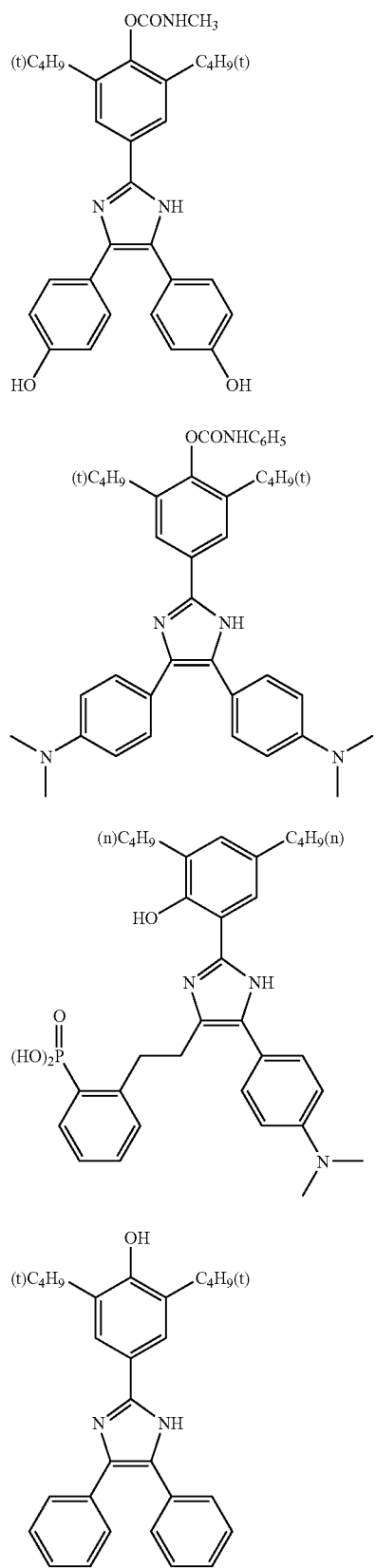
A-102
A-103
A-104
A-105
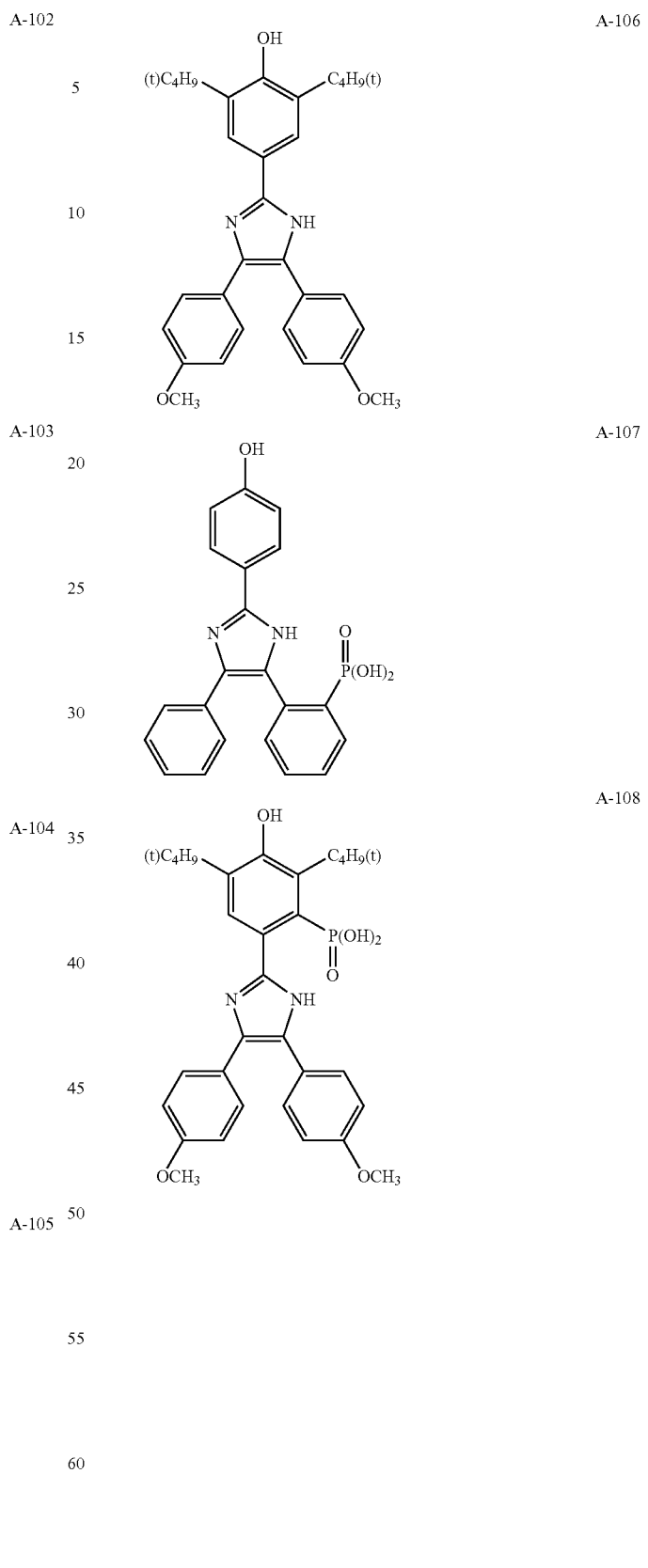
A-106
A-107
A-108

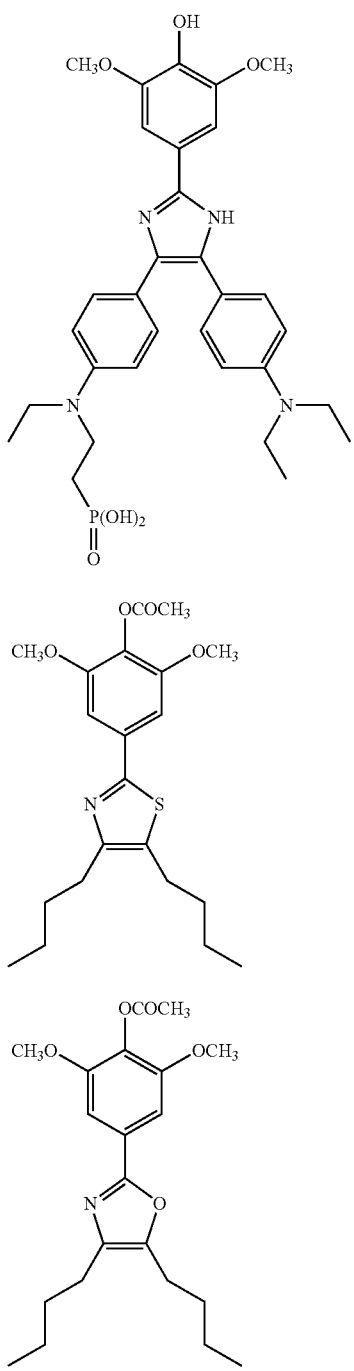
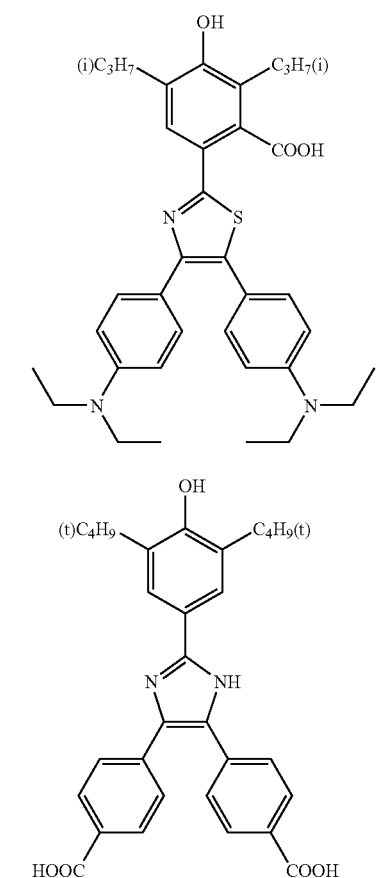

A-115

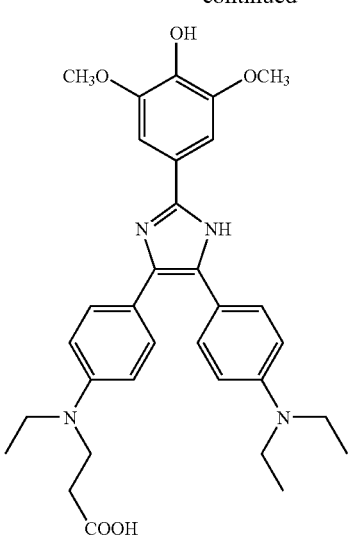

Next, a viologen electrochromic compound represented by Formula (B) according to the present invention will be described.

The viologen compound represented by Formula (B) has a phosphono group in the molecular structure and can be supported and fixed on the surface of transparent conductive inorganic fine particles to be described later, whereby an electron-injectable constituent layer having no memory capability in a non-observation side electrode can be provided.

In Formula (B), $R^3$ represents —$(CH_2)_m$— wherein m represents 0 or an integer of 1 to 10; an arylene group or a heteroarylene group each having 14 or less carbon atoms, a branched alkylene group, an alkenylene group, an aralkylene group or a cycloalkylene group each having 10 or less carbon atoms; each of the arylene group, heteroarylene group, branched alkylene group, branched alkenylene group, aralkylene group or cycloalkylene group may have a —P(O)(OH)$_2$ group through a —$(CH_2)$n- group or may be arbitrarily substituted, wherein n represents 0 or an integer of 1 to 10.

$R^4$ represents a group represented by $R^5R^6$, wherein $R^5$ represents —$(CH_2)_p$— wherein p represents 0 or an integer of 1 to 10, and $R^6$ represents —P(O)(OH)$_2$ group or an aryl group or a heteroaryl group each having 14 or less carbon atoms, and a branched alkyl group, an alkenyl group or a cycloalkyl group each having 10 or less carbon atoms or a hydrogen atom.

$X_2^-$ represents an ion which neutralize the charge.

Further, the above arylene group or heteroarylene group each having not more than 14 carbon atoms; branched alkylene group, branched alkenylene group, aralkylene group and the cycloalkylene group each having not more than 10 carbon atoms, which are each represented by $R^1$, may be arbitrarily substituted, or may be substituted by one substituent or two or more substituents, and, when they are substituted by two or more substituents, the substituents may be the same or different from each other.

Examples of the substituent include:
a lower alkyl group, a lower alkenyl group, a phenyl-substituted lower alkyl group, a diphenyl-substituted lower alkyl group, a phenyl group, a phenoxy group, a lower alkanoyloxy group, a halogen atom, an amino group, a cyano group, a nitro group, a lower alkylamino group, a di-(lower alkyl)amino group, a phenylamino group, a lower alkanolamino group, a benzoylamino group, a lower alkylsulfonylamino group, a phenylsulfonylamino group, a lower alkanoyl group, a benzoyl group, a carboxyl group, a lower alkoxycarbonyl group, a carbamoyl group, an N-lower alkylcarbamoyl group, an N,N-di-(lower alkyl)carbamoyl group, an ureido group, an N-lower alkylureido group, a lower alkylsulfonyl group, a phenylsulfonyl group, a hydroxyl group, a lower alkoxy group, an amino group, a lower alkylamino group, a di-(lower alkyl)amino group, a halogen atom, a carboxyl group, or a lower alkoxy group substituted with a lower alkoxycarbonyl group, an alkoxy group having 3-7 carbon atoms, and a divalent methylenedioxy group.

The phenyl group contained in such as the above phenyl group, benzoyl group, and a phenylamino group may be substituted with, for example, a lower alkyl group, a lower alkoxy group, a hydroxy group, a halogen atom and/or a nitro group.

Moreover, for example, the aryl group, heteroaryl group, branched alkyl group, alkenyl group or cycloalkyl group represented by $R^4$ may be non-substituted, however, may be substituted with one or more groups defined as substituents of above $R^1$.

In abovementioned Formula (B), a preferable compound is $R^3$ is —$(CH_2)_m$ (wherein m is 1, 2 or 3), a phenyl group (through —$(CH_2)_n$— group and p-position is substituted with —P(O)(OH)$_2$, wherein n is 1 or 2)); and, in $R^4$ (represented by $R^5R^6$), $R^5$ represents —$(CH_2)_p$— (wherein p is 0, 1, 2, or 3), $R^6$ is non-substituted phenyl or naphthyl, an alkyl group having 1-4 carbon atoms, a halogen atom, a cyano group, a nitro group, a phenoxy group, or a phenyl or naphthyl group mono-, di- or tri-substituted with a benzoyl group.

Further, $X_2^-$ is Cl$^-$, Br$^-$, ClO$_4^-$, PF$_6^-$, BF$_4^-$, C$_2$F$_6$NO$_4$S$_2^-$ or CF$_3$SO$_3^-$ and is specifically preferably Cl$^-$ and PF$_6^-$.

In abovementioned Formula (B), a preferable compound is: $R^3$ is -$(CH_2)_m$ (wherein m is 1, 2 or 3), a phenyl group (through —$(CH_2)_n$— group and p-position is substituted with —P(O)(OH)$_2$, wherein n is 1 or 2)); in $R^4$ (represented by $R^5$ and $R^6$), $R^5$ represents —$(CH_2)_p$— (wherein p is 0, 1, 2, or 3), $R^6$ is —P(O)(OH)$_2$ group, and X$^-$ is Cl$^-$, Br$^-$, ClO$_4^-$, PF$_6^-$, BF$_4^-$, C$_2$F$_6$NO$_4$S$_2$ or CF$_3$SO$_3^-$ and is specifically preferably Cl$^-$ and PF$_6^-$.

Examples of a compound represented by Formula (B) will be listed below:
(B-1) 1-phosphonoethyl-1'-methyl-4,4'-bipyridinium dibromide
(B-2) 1-phosphonoethyl-1'-(3-propylphenyl)-4,4'-bipyridinium bis-hexafluorophosphate
(B-3) 1-phosphonoethyl-1'-(2,4,6-trimethylphenyl)-4,4'-bipyridinium dichloride
(B-4) 1-phosphonoethyl-1'-(2,4,6-trimethylphenyl)-4,4'-bipyridinium bis-hexafluorophosphate
(B-5) 1-phosphonoethyl-1'-(naphthyl)-4,4'-bipyridinium dichloride
(B-6) 1-phosphonoethyl-1'-(4-cyanonaphthyl)-4,4'-bipyridinium dichloride
(B-7) 1-phosphonoethyl-1'-(4-methylphenyl)-4,4'-bipyridinium dichloride
(B-8) 1-phosphonoethyl-1'-(4-cyanophenyl)-4,4'-bipyridinium dichloride
(B-9) 1-phosphonoethyl-1'-(4-fluorophenyl)-4,4'-bipyridinium dichloride
(B-10) 1-phosphonoethyl-1'-(4-phenoxyphenyl)-4,4'-bipyridinium dichloride
(B-11) 1-phosphonoethyl-1'-(4-t-butylphenyl)-4,4'-bipyridinium dichloride
(3-12) 1-phosphonoethyl-1'-(2,6-dimethylphenyl)-4,4'-bipyridinium dichloride (B-13) 1-phosphonoethyl-1'-(3,5-dimethyl phenyl)-4,4'-bipyridinium dichloride
(B-14) 1-phosphonoethyl-1'-(4-benzophenone)-4,4'-bipyridinium dichloride
(B-15) 1-phosphonobenzyl-1'-(3-propyl phenyl)-4,4'-bipyridinium dichloride
(B-16) 1-phosphonobenzyl-1'-(3-propyl phenyl)-4,4'-bipyridinium bis-hexafluorophosphate
(B-17) 1-phosphonobenzyl-1'-(phosphonoethyl)-4,4'-bipyridinium dichloride
(B-18) 1-phosphonobenzyl-1'-(2,4-dinitrophenyl)-4,4'-bipyridinium dichloride
(B-19) 1-phosphonobenzyl-1'-(2,4-dinitrophenyl)-4,4'-bipyridinium bis-hexafluorophosphate
(B-20) 1-phosphonobenzyl-1'-(4-phenoxyphenyl)-4,4'-bipyridinium dichloride
(B-21) 1-phosphonobenzyl-1'-(4-phenoxyphenyl)-4,4'-bipyridinium bis-hexafluorophosphate
(B-22) 1-phosphonobenzyl-1'-(4-fluoro phenyl)-4,4'-bipyridinium dichloride
(B-23) 1-phosphonobenzyl-1'-(4-methylphenyl)-4,4'-bipyridinium dichloride
(B-24) 1-phosphonobenzyl-1'-(2,4,6-trimethylphenyl)-4,4'-bipyridinium dichloride
(B-25) 1-phosphonobenzyl-1'-(benzyl)-4,4'-bipyridinium dichloride
(B-26) 1-phosphonobenzyl-1'-(naphthyl)-4,4'-bipyridinium dichloride
(B-27) 1-phosphonobenzyl-1'-(phenyl)-4,4'-bipyridinium dichloride
(B-28) 1-phosphonobenzyl-1'-(4-cyanophenyl)-4,4'-bipyridinium dichloride
(B-29) 1-phosphonobenzyl-1'-(4-benzophenone)-4,4'-bipyridinium dichloride
(B-30) 1-phosphonobenzyl-1'-(4-cyanophenyl)-4,4'-bipyridinium dichloride
(8-31) 1-phosphonobenzyl-1'-(2,6-dimethyl phenyl)-4,4'-bipyridinium dichloride
(B-32) 1-phosphonobenzyl-1'-(3,5-dimethylphenyl)-4,4'-bipyridinium dichloride
(13-33) 1-phosphonobenzyl-1'-(2,4,6-trimethylphenyl)-4,4'-bipyridinium trifluoromethanesulfoneimide The manufacturing methods of these compounds are disclosed in abovementioned WO 2004/067673.

Next, the compound represented by above Formula (C) according to the present invention will be described.

In above Formula (C), $X_1$ and $X_2$ each represent —$NR_1'$—, —S— or —O—, wherein $R_1'$ represents a hydrogen atom or a bond to form a double bond with a neighboring atom; $Y_1$ and $Y_2$ each represents $CR_2'$ or N, wherein $R_2'$ represents a hydrogen atom or a bond to form a double bond with a neighboring atom; $Z_1$ and $Z_2$ each represents a group of atoms to form a heterocycle together with $X_1$ and $Y_1$ and with $X_2$ and $Y_2$; and the heterocycle formed by $Z_1$, $X_1$ and $Y_1$, and the heterocycle formed by $Z_2$, $X_2$ and $Y_2$ each may have a substituent or may form a condensed ring. Also, these heterocycles may form one condensed cycle as a hole through other hydrocarbon cycle or hetero cycle. The number of atoms of the atomic group constituting the hetero cycle is not specifically limited, however, a 5-numbered cycle or a 6-numbered cycle is preferable.

Preferable examples of a nitrogen-containing hetero cycles include: a pyridine ring, a pyrazine ring, a pyrimidine ring, a triazine ring, a quinoline ring, an isoquinoline ring, a pyrrole ring, an imidazole ring, a pyrazole ring, a triazole ring, an indole ring, a tetrazole ring, the thiazole ring, an oxazole ring and a purine ring. The substituent which substitutes the hetero cycle is not specifically limited, however, groups having high hydrophilicity, for example, a hydroxyl group, an amino group, a sulfo group, a phosphate group, a carboxyl group, a sulfamoyl group, and a hydroxyalkyl group are preferable.

Typical examples of a specific hetero cycle group constituting the compound represented by Formula (C) according to the present invention will be listed below.

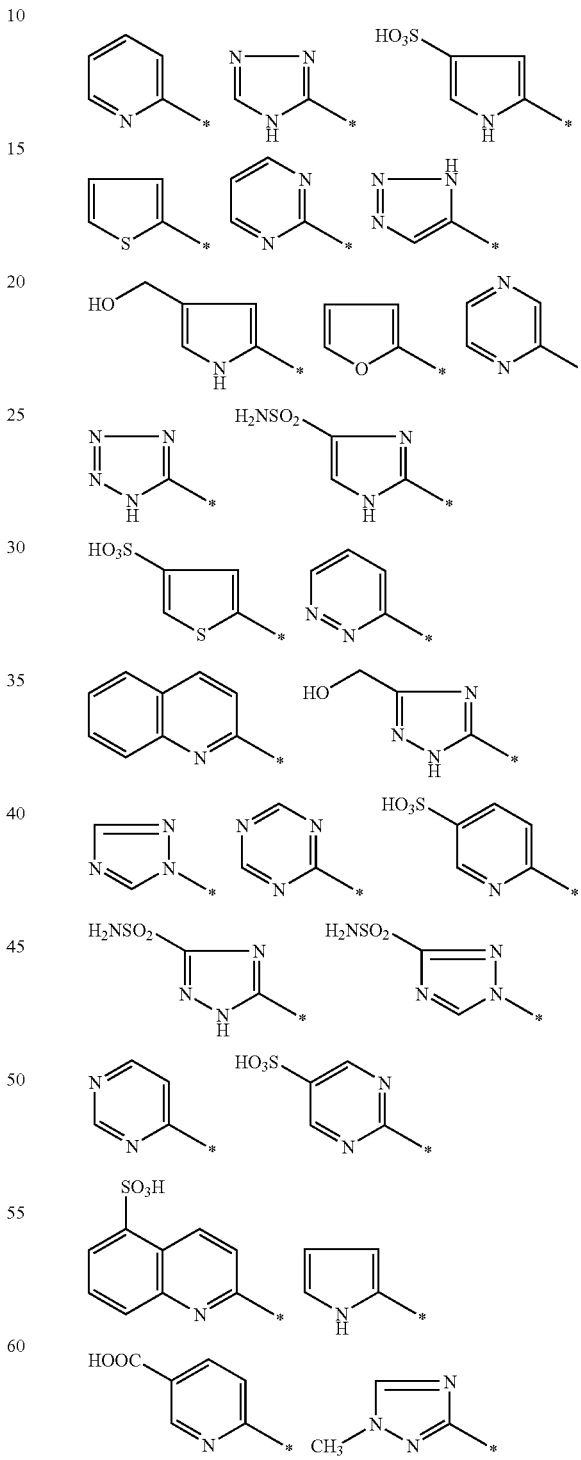

* represents a bond with another heterocycle group

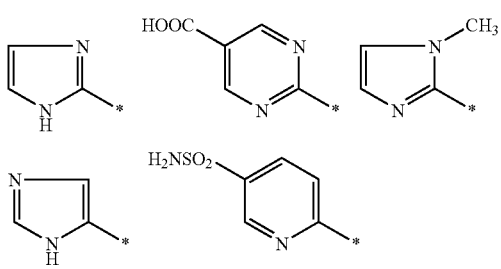
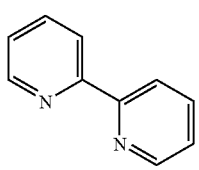
Next, Typical examples of a compound represented by Formula (C) will be listed below.

-continued
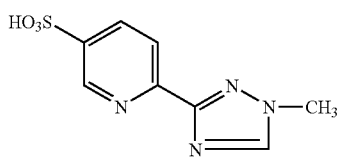
(C-18)
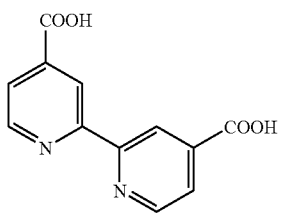
(C-19)
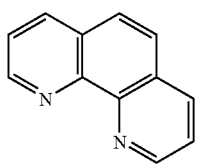
(C-20)
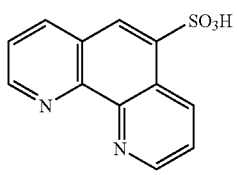
(C-21)
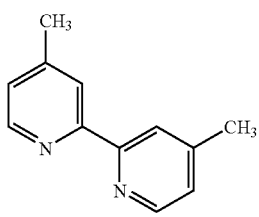
(C-22)
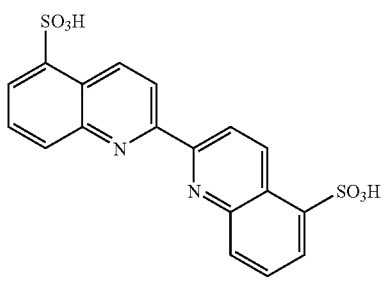
(C-23)
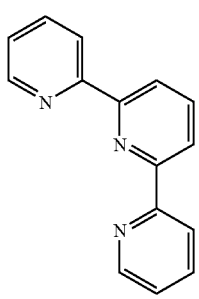
(C-24)
-continued
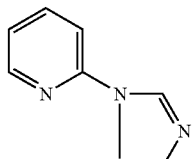
(C-25)
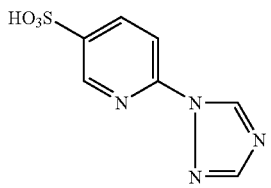
(C-26)
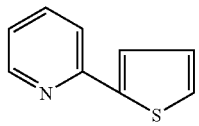
(C-27)
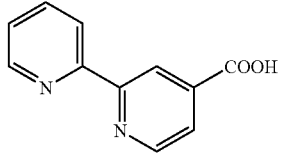
(C-28)
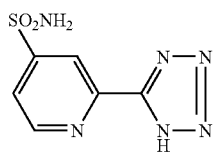
(C-29)
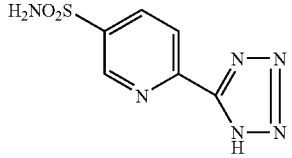
(C-30)
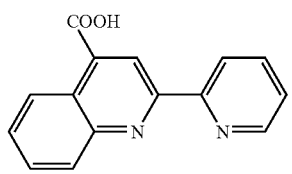
(C-31)
(C-32)
(C-33)
R: —CONH(CH₂)₃SO₃H

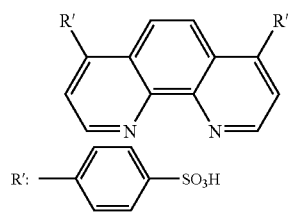

(C-34)

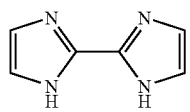

(C-35)

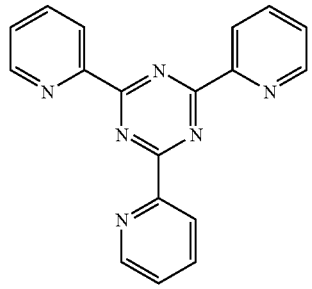

(C-36)

These compounds can be purchased as commercial products, and also can be synthesized according to the methods which have been reported in abstracts and papers such as Beilsteins Handbuch der Organischen Chemie (Beilsteins Handbuch der Organischen Chemie), Annalen der Chemie (Ann. Chem.), Chemical Abstracts (Chem. Abstracts), Journal of the American chemical Society (J. Am. Chem. Soc.), Monatshefte für Chemie (Monatsch. Chem.), Journal der Russischen Physikalish-Chemischen Gescllschaft (Journal der Russischen Physikalish-Chemischen Gescllschaft).

Among the compounds represented by Formula (C), specifically preferable compounds are (C-1), (C-6), (C-7), (C-31) and (C-36).

As the metal used in the metal complex having a compound represented by Formula (C) as a ligand, any metal is applicable as long as it can coordinate Formula (C), however, for example, Fe, Co, Ru, Rh, Pd, Ni, Cu or Zn may be preferably used.

[Support of Electrochromic Dye in Porous Layer Containing the Metal Oxide]

The method of manufacturing a display element of the present invention is characterized in that plural kinds of inks having a function to uniformize an amount of the electrochromic dye supported in the porous layer containing the metal oxide in one pixel of the display element are ejected on the porous layer containing the metal oxide using an inkjet apparatus.

As an inkjet apparatus applicable to the present invention, conventionally known inkjet ejecting apparatuses (inkjet printers) may be used without limitation. An Inkjet recording head of the present invention may be either an on-demand system or a continuous system. Further, employed as an ejection system may be an electrical-mechanical conversion system (for example, a single cavity type, a double cavity type, a vendor type, a piston type, a share mode type, and a shared wall type), an electrical-thermal conversion system (for example, a thermal ink-jet type, a BUBBLE JET (being a registered trade name) type).

Further, as an inkjet apparatus applicable in the present invention, an ejecting method employing a pressure applying means and an electric field applying means may be used. In this ejecting method, a nozzle having an ejecting portion of which inner diameter is 0.1-100 μm. A voltage having an arbitrary wave is applied to the ink to charge, whereby the ink is ejected from the ejecting portion on the substrate. Namely, since the inner diameter of the ejecting portion of the nozzle is 0.1-100 μm, the distribution of the electric field is narrow. Therefore, the electric field can be concentrated by applying the voltage having an arbitrary wave to the electrically conductive ink supplied to the nozzle. As the result, the formed ink droplet can be minute while having a stable shape. Thus, an ink droplet pattern made of plural ink droplets smaller than the conventional ink droplets, such as less than 1 pl (pico litter) can be formed. Further, since the distribution of the electric field is narrow, the total applying voltage applied to the electrically conductive ink can be reduced. After ejected from the nozzle, the ink droplets are accelerated by the electrostatic force generated by the charge and the electric field, however, since the electric field is drastically decreased when the droplets leave away from the nozzle, the speed of the droplets decreases due to the air resistance. However, the minute ink droplets to which the electric field is concentrated are accelerated by an image force as the droplets become closer to the resin layer. By controlling the balance between the air resistance and the image force, the minute droplets can be stably flied, whereby the landing accuracy is improved.

In the method of manufacturing a display element of the present invention, at least one of the inks preferably contains the above explained electrochromic dye.

Further, in the method of manufacturing a display element of the present invention, at least one of the inks according to the present invention preferably has a function to desorb the electrochromic dye from the porous layer containing the metal oxide and redissolve the electrochromic dye in the ink to uniformly diffuse the electrochromic dye in the pixel.

In the present invention, the method of providing a function to desorb the electrochromic dye from the porous layer containing the metal oxide is not specifically limited, and can be achieved by controlling the affinity of the EC dye to the porous layer by controlling the polarity of the EC dye, the polarity of the porous layer and the polarity of the solvent on the ink. Specifically, when the desorption of the EC dye from the porous layer is operated via the carboxylic acid group contained in the EC dye, an opposing salt with the carboxylic acid group of the EC dye is easily formed by making the ink basic in order to increase the solubility of the EC dye in the ink. For example, the EC dye can be desorbed from the porous layer containing the metal oxide by incorporating such as triethanolamine, dibutyl amine, ammonia or a pyridine derivative in the ink. These compounds used for the ink is preferable volatile except the EC dye.

Further, in the method of manufacturing a display element of the present invention, at least one of the inks according to the present invention preferably has a function to readsorb the electrochromic dye to the porous layer containing the metal oxide.

In the present invention, the method of readsorbing the electrochromic dye to the porous layer containing the metal oxide is not specifically limited, and can be achieved by controlling the affinity of the EC dye to the porous layer by controlling the polarity of the EC dye, the polarity of the porous layer and the polarity of the solvent on the ink. Specifically, when the readorption of the EC dye to the porous layer is operated via the carboxylic acid group contained in the EC dye, the EC dye can be readsorbed to the porous layer containing the metal oxide by incorporating such as p-toluenesulfonic acid, acetic acid or trifluoro methansulfonic acid which exhibit high acidity where the carboxylic acid group hardly dissociate or a solution in which the solubility of the EC dye is low, in the ink. These compounds used for the ink is preferable volatile except the EC dye.

When the EC dye is a metal complex having a ligand represented by Formula (C), it is also possible to perform adsorption or desorption of the EC dye using the difference in the stability constant of the complex over the solvent of the ink. For example, when the molecular weight of the ligand is 200 or less, the stability constant of the complex is small over high polarity solvents such as methanol, ethanol or acetonitrile. Accordingly, the metal portion tends to be released from the complex and the metal complex also tends to be desorbed. Alternatively, in a non-polar solvent such as toluene, xylene or hexane, the stability constant of the complex is large and the adsorption of the metal complex tends to be strong.

When the electrochromic dye is a metal complex, after adsorption or desorption of only the ligand compound is carried out in the same way as described above, an ink of a metal which is capable of being coordinated is supplied later to form a metal complex on the substrate.

Further, in the method of manufacturing a display element of the present invention, at least one of the inks according to the present invention preferably has a function to at least one of the inks according to the present invention has a function to disturb adsorption of the electrochromic dye to the porous layer comprising the metal oxide. The method of disturbing the adsorption of the EC dye to the porous layer containing the metal oxide is not specifically limited, and usable are, for example, a method to bung up the pore of a porous layer membrane with a polymer solution containing an epoxy compound or an acryl compound, and a method to eject an ink containing a compound having a carboxylic acid group, a hydroxyl group or a phosphoric acid group, while the compound being inert to an electrochemical redox reaction, before ejecting the ink containing the EC dye. Specific examples of such a compound include: benzoic acid, 1-phosphonoethyl-2-pyridinium bromide, 1-phosphonoethyl-2-hexane and 1-phosphonoethyl-2-dodecane.

Also, an ink which alters the wettability to the solvent of the surface of the adsorption support is usable. For example, in order to alter the surface of the adsorption support hydrophobic, a surfactant or a compound such as acetylacetone can be used, and, in order to alter the surface of the adsorption support hydrophilic, an amide surfactant having hydrophilicity may be used to prepare an ink.

The space region which disturbs the adsorption may be a planar pattern or a pattern in the depth direction when the cross-section of a display element is viewed. In order to control the pattern in the depth direction, the water repellency of the surface may be utilized. For example, a hydrophobicity-hydrophilicity patter in the depth direction can be obtained by applying an ink which alters the surface of the adsorption support hydrophilic while calculating the amount of the ink soaks into the adsorption support of the ink, followed by applying a hydrophilic ink while calculating the residual soaking amount. Further, by coating, first, the vicinity of the surface of the adsorption support with a hydrophilic polymer, then, adsorbing an electrochromic dye until saturation in the adsorption support not covered by the hydrophilic polymer, washing away the hydrophilic polymer, and applying a second electrochromic dye, the second dye can be adsorbed in the portion having been covered by the hydrophilic polymer. By using these methods, different electrochromic dyes can be arranged in the depth direction, whereby constitution of a display element which is advantageous for a full color or a multicolor display element can be obtained.

In the ink according to the present invention, various additives may be used if necessary, other than the compounds described above.

In the ink according to the present invention, a water-soluble organic solvent may be used. Examples of a water-soluble organic solvent usable in the present invention include: alcohols (for example, methanol, ethanol, propanol, isopropanol, butanol, isobutanol, secondary-butanol, tertiary-butanol, pentanol, hexanol, cyclohexanol and benzyl alcohol), polyalcohols (for example, ethylene glycol, diethylene glycol, triethylene glycol, polyethylene glycol, propylene glycol, dipropylene glycol, polypropylene glycol, butylene glycol, hexane diol, pentane diol, glycerin, hexane triol and thiodiglycol), polyalcohol ethers (for example, ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether and propylene glycol monophenyl ether), amines (for example, ethanolamine, diethanolamine, triethanolamine, N-methyldiethanolamine, N-ethyl diethanolamine, morpholine, N-ethyl morpholine, ethylenediamine, diethylenediamine, triethylenetetramine, tetraethylenepentamine, polyethylene imine, pentamethyl diethylenetriamine and tetramethylpropylenediamine), amides (for example, formamide, N,N-dimethylformamide and N,N-dimethylacetamide), heterocycles (for example, 2-pyrrolidone, N-methyl-2-pyrrolidone, cyclohexyl pyrolidone, 2-oxazolidone and 1,3-dimethyl-2-imidazolidinone), sulfoxides (for example, dimethyl sulfoxide), sulfones (for example, sulfolane), urea, acetonitrile and acetone.

In the ink according to the present invention, as other additives, in order to improve ejection stability, suitability to the print head and the ink-jet cartridge, storage stability, image storage stability and others, well-known various additives may be used. For example, a viscosity modifier, a regulator of surface tension, a specific resistance regulator, a film-forming ingredient, a dispersing agent, a surfactant, a UV absorber, an antioxidant, an anti-discoloring agent, a fungicide and a rust preventive may be suitably selected to use. Examples of such additives include: organic latexes such as polystyrene, polyacrylic acid ester, polymethacrylic acid ester, polyacrylamide, polyethylene, polypropylen, polyvinyl chloride, polyvinylidine chloride, copolymers thereof, a urea resin and a melamine resin; oil droplets such as liquid paraffin, dioctyl phthalate, tricresyl phosphate and silicone oil; cationic or nonionic surfactants; UV absorbers disclosed in JP-A Nos. 57-74193, 57-87988 and 62-261476; anti-discoloring agents disclosed in JP-A Nos. 57-74192, 57-87989, 60-72785, 61-146591, 1-95091 and 3-13376; optical brightening agents disclosed in JP-A Nos. 59-42993, 59-52689, 62-280069, 61-242871 and 4-219266; and PH adjustors such as sulfuric acid, phosphoric acid, citric acid, sodium hydroxide, potassium hydroxide, and potassium carbonate.

The preparation of the ink according to the present invention is not specifically limited. However, it is preferable that, when an ink containing various additives is prepared, the ink is prepared so as not to cause aggregation or sedimentation in the preparation step. If necessary, the adding order or adding rate of the additives may be adjusted.

The viscosity of the ink according to the present invention is not specifically limited. However, it is preferable that the viscosity at 25° C. is 2 mPa·s or more but 10 mPa·s or less. The viscosity of the inkjet ink according to the present invention is not preferably shear rate dependent.

The surface tension of the ink according to the present invention is preferably 40 mN/m or less, and more preferably 25-35 mN/m.

The surface tension (mN/m) of the ink as mentioned in the present invention is a value measured at 25° C. and the measuring method is described in the reference of such as general surface chemistry and colloid chemistry. For example, volume 18 (interface and colloid) of Shin-Jikken Kagaku Koza, edited by The Chemical Society of Japan, Published by Maruzen Co., Ltd., pages 68-117 can be referred to.

The electrical conductivity of the ink according to the present invention is preferably 1 mS/m or more but 500 mS/m or less, more preferably 1 mS/m or more but 200 mS/m or less, and further more preferably 10 mS/m or more but 100 mS/m or less, in view of ink storage stability. In the preparation of the ink according to the present invention, it is preferable that the concentrations of the ions are suitably adjusted.

[Constitution of Display Device]

The constituting layer between the opposed electrodes of the display device according to the present invention will be further described.

According to the invention described in claim 7, it is preferable that the display regions having substantially different color hues from each other are arranged in a plane by separately applying the electrochromic dyes using an inkjet apparatus to perform a color display.

According to the invention described in claim 8, it is preferable that the display element contains a silver salt electrolyte and a white scattering material between the opposed electrodes and performs a multicolor display of three or more colors containing a black display, a white display and a display of a color other than black by a driving operation using the opposed electrodes.

In the present invention, a color display is carried out by planarly arranging display regions having substantially different color hues other than black from each other. It is further preferable that, in addition to the color display using an EC dye, a black display using a silver salt compound is combined, and a color display and a white-black display are simultaneously performed between one pair of electrodes. The method to planarly arrange display regions displaying substantially different colors is preferably carried out by separately painting different electrochromic compounds each being at least one compound selected from the group consisting of a compound represented by Formula (A), a compound represented by Formula (B) and a metal complex having a ligand represented by Formula (C) using an inkjet method to support these electrochromic compounds in a porous metal oxide layer.

When a color display is performed in the display element according to the present invention, applicable is a method to divide the space between the pair of opposed electrodes by a dividing wall and form porous layers containing a metal oxide, followed by providing inks having each EC dye to the prescribed blocks or a method in which, after forming a porous layer containing a metal oxide, an ink having a function to prevent an EC dye to be supported to form blocks, followed by providing inks having each EC dye to the prescribed blocks.

[Electrolyte]

The "electrolyte" as used in the present invention generally refers to a substance which exhibits ionic conduction when the substance is dissolved in a solvent such as water (hereafter, referred to as "an electrolyte in a narrow sense"), however, in the explanation in the present invention, a mixed substance in which a metal or a compound which may be an electrolyte or a non-electrolyte is contained in an electrolyte in a narrow sense is also referred to as the "electrolyte" (hereafter referred to as an electrolyte in a broad sense).

[Silver Compound]

The silver compound according to the present invention is a general term including silver and a compound containing silver in the chemical structure, for example, a silver oxide, a silver sulfide, metallic silver, silver colloid particles, a silver halide, a silver complex compound, or a silver ion. The state of phase, such as solid state, solubilization state to a liquid, or gaseous state, and charge state such as neutral, anionic or cationic, are not specifically limited.

[White Scattering Material]

The present invention has a feature that, in view of more enhancing the display contrast and the reflectivity of the white display, a white scattering material is incorporated. The white scattering material may be incorporated by providing a porous white scattering layer.

The porous white scattering layer applicable to the present invention can be formed by coating and drying an aqueous admixture of aqueous polymers, which are substantially insoluble in the electrolyte solvents, and white pigments.

White pigments applicable to the present invention include, for example, titanium dioxide (an anatase type or a rutile type), barium sulfate, calcium carbonate, aluminum oxide, zinc oxide, magnesium oxide, as well as zinc hydroxide, magnesium hydroxide, magnesium phosphate, magnesium hydrogenphosphate, alkaline earth metal salts, talc, kaolin, zeolite, acid clay, glass; and further include organic compounds such as polyethylene, polystyrene, acryl resins, ionomers, ethylene-vinyl acetate copolymer resins, benzoguanamine resins, urea-formalin resins, melamine-formalin resins, and polyamide resins. These materials may be used individually or in the form of a composite mixture, as well as in a state containing, in the particles, voids which alter the refractive index.

In the present invention, among above white particles, titanium dioxide, zinc oxide, or zinc hydroxide is preferably employed. Further, employable are titanium dioxide which has been subjected to a surface treatment employing an inorganic oxide (such as $Al_2O_3$, AlO(OH), and $SiO_2$), or titanium dioxide which has been subjected to a treatment employing an organic compound such as trimethylolethane, triethanolamine acetic acid salts, and trimethylcyclosilane, in addition to the above surface treatment.

Of these white particles, titanium oxide or zinc oxide is more preferably employed in view of prevention of coloring at a higher temperature or an increase of reflectance of elements arising from the reflective index.

In the present invention, aqueous polymers, which are substantially insoluble in electrolyte solvents, include a water-soluble polymer, and a polymer which has been dispersed in a water-based solvent.

Water-soluble compounds include proteins such as gelatin and gelatin derivatives; cellulose derivatives; natural compounds such as polysaccharides including starch, gum arabic, dextran, pullulan, or carrageenan; and synthetic polymer compounds such as polyvinyl alcohol, polyvinylpyrrolidone, acrylamide polymers, and derivatives thereof. Gelatin derivatives include acetylated gelatin and phthalated gelatin. Polyvinyl alcohol derivatives include terminal alkyl group-modified polyvinyl alcohol and terminal mercapto group-modified polyvinyl alcohol. Cellulose derivatives include hydroxyethyl cellulose, hydroxypropyl cellulose, and carboxymethyl cellulose. Further, compounds described in Research Disclosure and on pages 71-75 of JP-A 64-13546, and high waterabsorptive polymers such as homopolymers of vinyl monomers having —COOM or —SO3M (M being a hydrogen atom or an alkaline metal) and copolymers of these vinyl monomers with each other and other vinyl monomers (for example, sodium methacrylate, ammonium methacrylate, and potassium acrylate) may be employed, which are described in U.S. Pat. No. 4,960,681 and JP-A 62-245260. These binders may be employed in combination of two or more of them.

In the present invention, gelatin and derivatives thereof, or polyvinyl alcohol and derivatives thereof may be preferably employed.

Polymers dispersed in water based solvents include latexes such as natural rubber latex, styrene butadiene rubber, butadiene rubber, nitrile rubber, chloroprene rubber, and isoprene rubber; and heat curable resins which are prepared by dispersing, in water based solvents, polyisocyanate based, epoxy based, acryl based, silicone based, polyurethane based, urea based, phenol based, formaldehyde based, epoxy-polyamide based, melamine based, or alkyd based resins, or vinyl based resins. Of these polymers, it is preferable to employ water based polyurethane resins described in JP-A No. 10-76621.

The phrase, "being substantially insoluble in electrolyte solvents", as described in the present invention, is defined as a state in which the dissolved amount per kg of the electrolyte solvents is at least 0 g and at most 10 g in the temperature range of $-20$ to $120°$ C. It is possible to determine the above dissolved amount employing the commonly known methods, such as a mass measuring method, or a component quantification method utilizing a liquid chromatogram or a gas chromatogram.

In the present invention, a preferred embodiment of the aqueous admixture of a water-based compound and titanium oxide is that the titanium oxide is dispersed in water according to the commonly known dispersion methods. The mixing ratio of a water based compound to titanium oxide is preferably in the range of 1 to 0.01 in terms of volume ratio, and is more preferably in the range of 0.3 to 0.05.

In the present invention, a medium, on which the aqueous admixture of a water-based compound and a white pigment is coated, may be located anywhere as long as it is located on the constitutional components between the counter electrodes of the display element. However, it is preferable that the medium is provided on the surface of at least one of the above counter electrodes. Examples of providing methods to the medium include a coating method; a liquid spraying method; a spraying method via a gas phase such as a method which jets liquid droplets employing vibration of a piezoelectric element such as a piezoelectric system ink-jet head, and a BUBBLE JET (registered trade name) ink-jet head which ejects liquid droplets employing a thermal head utilizing bumping; and a spray method in which liquid is sprayed via air or liquid pressure.

The coating method may be appropriately selected from any of the commonly known coating methods, and examples thereof include an air doctor coater, a blade coater, a rod coater, a knife coater, a squeeze coater, an impregnation coater, a reverse roller coater, a transfer roller coater, a curtain coater, a double roller coater, a slide hopper coater, a gravure coater, a kiss roller coater, a bead coater, a cast coater, a spray coater, a calender coater, and an extrusion coater.

Methods for drying the aqueous admixture of a water based compound and a white pigment provided on the medium are not particularly limited as long as they facilitate water evaporation. Examples thereof include heating employing a heating source, a heating method employing infrared radiation, and a heating method utilizing electromagnetic induction. Further, water evaporation may be performed under reduced pressure.

The term "porous", as described in the present invention, refers to the following state. The porous white scattering materials are formed by applying the above aqueous admixture of the water-based compound and the white pigment to the electrode and subsequently drying the resulting coating, after which, an electrolyte, containing silver or a compound containing silver in its chemical structure, is provided onto the aforesaid scattering material. Then, the resulting scattering material is sandwiched between counter electrodes. The above state is such that when electric potential is applied between the resulting counter electrodes, it is possible to cause silver dissolution and deposition reaction, and refers to a penetration state in which ion species are movable between the electrodes.

In the display element according to the present invention, it is preferable that the water based compound in the above-described aqueous admixture is subjected to a hardening reaction employing a hardening agent during coating and drying thereof or after drying of the same.

Examples of hardening agents employed in the present invention include those described in the column 41 of U.S. Pat. Nos. 4,678,739, and 4,791,042, as well as JP-A Nos. 59-116655, 62-245261, 61-18942, 61-249054, 61-245153, and 4-218044. Specific hardening agents include aldehyde based hardening agents (such as formaldehyde), aziridine based hardening agents, epoxy based hardening agents, vinylsulfone based hardening agents (such as N,N'-ethylene-bis(vinylsulfonylacetamido)ethane), N-methylol based hardening agents (such as dimethylolurea), boric acid, metaboric acid, and polymer hardening agents (compounds described in documents such as JP-A No. 62-234157). In case where gelatin is employed as a water-based compound, of the above hardening agents, it is preferable to employ vinylsulfone type hardening agents or chlorotriazine type hardening agents individually or in combination thereof. Further, in case where polyvinyl alcohol is employed, it is preferable to employ boron-containing compounds such as boric acid and metaboric acid.

The amount of these hardening agents employed is 0.001 to 1 g per gram of the water-based compound, and preferably is 0.005 to 0.5 g. In order to increase layer strength, a heat treatment or humidity regulation during the hardening reaction may also be carried out.

[Compounds Represented by Formulas (1) and (2)]

In the display element according to the present invention, the electrolyte may contain a compound represented by Formula (1) or (2).

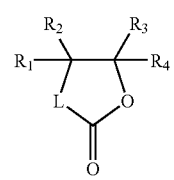

Formula (1)

In above Formula (1), L represents an oxygen atom or $CH_2$, and $R_1$-$R_4$ each represent a hydrogen atom, an alkyl group, an alkenyl group, an aryl group, a cycloalkyl group, an alkoxy alkyl group or an alkoxy group.

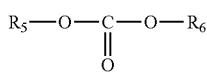
Formula (2)

In above Formula (2), $R_5$ and $R_6$ each represent a hydrogen atom, an alkyl group, an alkenyl group, an aryl group, a cycloalkyl group, an alkoxy alkyl group or an alkoxy group.

The compound represented by Formula (1) will be explained, first.

In above Formula (1), L represents an oxygen atom or $CH_2$, and $R_1$-$R_4$ each represent a hydrogen atom, an alkyl group, an alkenyl group, an aryl group, a cycloalkyl group, an alkoxy alkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (1) will be shown below, however, the present invention is not limited thereto.

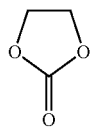
1-1

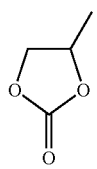
1-2

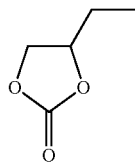
1-3

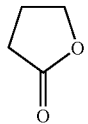
1-4

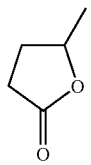
1-5

Subsequently, the compound represented by Formula (2) will be explained.

In abovementioned Formula (2), $R_5$, $R_6$ each represent a hydrogen atom, an alkyl group, an alkenyl group, an aryl group, a cycloalkyl group, an alkoxyalkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (2) will be shown below, however, the present invention is not limited to these exemplified compounds.

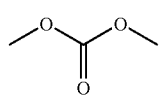
2-1

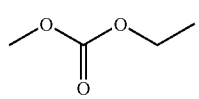
2-2

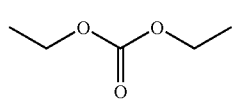
2-3

Among the compounds represented by Formula (1) and Formula (2), exemplified compounds (1-1), (1-2) and (2-3) are specifically preferable.

The compounds represented by Formula (1) and Formula (2) belong to one sort of an electrolyte solvent. In the display element according to the present invention, another solvent can be used in combination, provided that the object effect of the present invention is not lost. Examples of such a solvent include: tetramethylurea, sulfolane, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethylacetate, ethylpropionate, dimethoxyethane, diethoxyfuran, tetrahydrofuran, ethylene glycol, diethylene glycol, triethylene glycol monobutyl ether and water. It is preferable that, among these solvents, at least one solvent having a freezing point of −20° C. or lower and a boiling point of 120° C. or more is incorporated.

Further, listed as solvent employable in the present invention are the compounds shown in: J. A. Riddick, W. B. Bunger, T. K Sakano, "Organic Solvents", 4th. ed., John Wiley & Sons (1986), Y. Marcus, "Ion Salvation", John Wiley & Sons (1985), C. Reichardt, "Solvents and Solvent Effects in Chemistry", 2nd ed., VCH (1988) and G. J. Janz, R. P. T. Tomkins, "Nonaqueous Electorlytes Handbook", Vol. 1, Academic Press (1972).

In the present invention, the electrolyte solvent may be a single kind or may be a mixture, however, a mixed solvent containing ethylene carbonate is preferable. The added amount of ethylene carbonate is preferably 10 mass % or more but 90 mass % or less. A mixed electrolyte solvent having a propylene carbonate/ethylene carbonate mass ratio of 7/3 to 3/7 is specifically preferable. When the propylene carbonate mass ratio is larger than 7/3, ionic conductivity of the electrolyte may become lower, resulting in decrease of response rate, while when it is smaller than 3/7, deposition of electrolyte tends to occur at a lower temperature.

[Content Ratio of Halogen Ion and Silver Ion]

In the display element according to the present invention, when a molar content of halogen ions or halogen atoms contained in the electrolyte of the display element is represented as [X](mole/kg) and a total molar content of silver or silver contained in the compound having silver in the chemical structure in the electrolyte is represented as [Ag] (mole/kg), it is preferable that following Condition (1) is satisfied:

$$0 \leq [X]/[Ag] \leq 0.01 \quad \text{Condition (1)}$$

In the present invention, "a halogen atom" means an iodine atom, a chlorine atom, a bromine atom or a fluorine atom. When the [X]/[Ag] value is larger than 0.01, the reaction of $X^- \rightarrow X_2$ tends to occur while silver is oxidized-reduced. $X_2$ easily dissolves blackened silver by cross-oxidizing the blackened silver, which is one of the factors degrading memory function of the display. Accordingly, the molar content of halogen is preferably as low as possible against the molar content of silver. In the present invention, more preferable is $0 \leq [X]/[Ag] \leq 0.001$. When halogen ions are added, with respect to improving a memory function, the total molar content of each halogen species preferably satisfies $[I] < [Br] < [Cl] < [F]$.

In the display element according to the present invention, a silver dissolving agent other than halogen may be used. As a preferable silver dissolving agent, compounds represented by Formulas (1)-(7) of JP-A No. 2005-266652 may be cited. Among these compounds, specifically preferable compounds are those represented by Formulas (2) and (6).

[Electrolyte-Silver Salt]

In the display element according to the present invention, silver salts known in the art can be used. Examples of such silver salts include: silver iodide, silver chloride, silver bromide, silver oxide, silver sulfide, silver citrate, silver acetate, silver behenate, p-toluenesulfonic acid silver salt, silver trifluoromethanesulfonate, a silver salt of mercapto compound and a silver complex with an iminodiacetic acid. Of these, preferable is a silver salt which does not contain a nitrogen atom having coordinating property with halogen, carboxylic acid or silver, for example, a silver salt of p-toluenesulfonic acid is preferable.

The content of silver ions in the electrolyte layer of the present invention is preferably 0.2 mole/kg$\leq$[Ag]$\leq$2.0 mole/kg. When the content of silver ions is smaller than 0.2 mole/kg, the silver solution becomes too diluted and the driving rate is reduced, while, when the content of silver ions is larger than 2 mole/kg, the solubility becomes too low, and precipitation tends to occur while stored at a lower temperature, which is disadvantageous.

In the display element according to the present invention, various constitution layers can be provided, if necessary, besides the structural element explained above.

[Electron Insulation Layer]

The display element according to the invention may contain an electrical insulation layer.

The electron insulation layer applicable to the invention may be a layer which has ion conductivity as well as electron insulation property. Examples thereof include a solid electrolyte film made of a salt or a polymer having a polar group, a quasi-solid electrolyte film which is a porous film with high electron insulation property and has an electrolyte in the voids, a polymer porous film having voids and a porous film made of an inorganic material having low dielectric constant such as a silicon-containing compound.

Formation of a porous film can employ commonly known methods, including a sintering method (or a fusion method, in which polymer microparticles or inorganic particles are partially fused together with a binder and employing pores formed between particles), a subtraction method (in which a layer composed of a solvent-soluble organic or inorganic material and a solvent-insoluble binder is formed and the organic or inorganic material is dissolved by a solvent to form pores), a foaming method of allowing a polymeric material to foam by heating or degassing, a phase conversion method of allowing a mixture of polymers to be phase-separated by using a good solvent and a poor solvent, and a radiation exposure method of exposing to various kinds of radiations to form pores. Specifically, there are cited electron insulation layers described in JP-A Nos. 10-30181 and 2003-107626, JP-A No. 7-95403, and Japanese Patent Nos. 2635715, 2849523, 2987474, 3066426, 3464513, 3483644, 3535942 and 3062203.

[Electrolyte Materials]

In the display element according to the present invention, when electrolytes are in liquid form, it is possible to incorporate, in the electrolytes, the following compounds. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonim borofluoride, tetrabutylammonium borofluoride, and tetrabutylammonium halide. In addition, preferably used are fused salt electrolyte compositions described in paragraphs [0062]-[0081] of JP-A No. 2003-187881. Further employed are compounds which form oxidation-reduction pairs such as $I^-/I_3^-$, $Br^-/Br_3^-$ and quinone/hydroquinone.

Further, when electrolytes are in solid form, it is possible to incorporate, in the electrolytes, the following compounds which exhibit electronic or ionic conductivity.

Listed are fluorinated vinyl based polymers containing perfluorosulfonic acid; polythiophene; polyaniline; polypyrrole, triphenylamines; polyvinylcarbazoles; polymethylphenylsilanes; calcogenides such as $Cu_2S$, $Ag_2S$, $Cu_2Se$, or $AgCrSe_2$; fluorine compounds such as $CaF_2$, $PbF_2$, $SrF_2$, $LaF_3$, $TlSn_2F_5$, or $CeF_3$; lithium salts such as $Li_2SO_4$ or $Li_4SiO_4$; as well as compounds such as $ZrO_2$, $CaO$, $Cd_2O_3$, $HfO_2$, $Y_2O_3$, $Nb_2O_5$, $NO_3$, $Bi_2O_3$, $AgBr$, $AgI$, $CuCl$, $CuBr$, $CuBr$, $CuI$, $LiI$, $LiBr$, $LiCl$, $LiAlCl_4$, $LiAlF_4$, $AgSBr$, $C_5H_5NHAg_5I_6$, $Rb_4Cu_{16}I_7Cl_{13}$, $Rb_3Cu_7Cl_{10}$, $LiN$, $Li_5NI_2$, or $Li_6NBr_3$.

Further employed as supporting electrolytes may be electrolytes in gel form. When electrolytes are nonaqueous, it is possible to employ oil gelling agents described in paragraphs [0057]-[0059] of JP-A No. 11-185836.

[Thickening Agents Added to the Electrolyte]

In the display element according to the present invention, it is possible to use thickening agents in the electrolyte layer. Examples include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, polyacrylic acid, and polyurethane as a transparent hydrophobic binder.

These thickening agents may be employed in combinations of at least two types. Further listed are the compounds described on pages 71-75 of JP-A No. 64-13546. Of these, in view of compatibility with various types of additives and enhancement of dispersion stability of white particles, preferably employed compounds are polyvinyl alcohols, polyvinylpyrrolidones, hydroxypropyl celluloses, and polyalkylene glycols.

[Other Additives]

In the display element according to the present invention, listed as constitution layers include ancillary layers such as a protective layer, a filter layer, an antihalation layer, a crossover light cutting layer, or a backing layer. If necessary, incorporated in these ancillary layers may be various chemical sensitizers, noble metal sensitizers, photosensitive dyes, supersensitizers, couplers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbers, antirradiation dyes, filter light absorbing dyes, mildewcides, polymer latexes, heavy metals, antistatic agents, and matting agents.

The additives listed above are more detailed in Research Disclosure (hereinafter referred to as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds and their citations in these three Research Disclosures are listed below.

| Additives | RD 17643 | | RD 18716 | | RD 308119 | |
|---|---|---|---|---|---|---|
| | Page | Section | Page | Section | Page | Section |
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

[Metallocene Compound]

In the electrolyte according to the present invention, a metallocene derivative may be used. It is preferable to use a ferrocene derivative as the metallocene derivative. Examples of a ferrocene derivative include: ferrocene, methyl ferrocene, dimethyl ferrocene, ethyl ferrocene, propyl ferrocene, n-butyl ferrocene, t-butyl ferrocene and 1-1-dicarboxy ferrocene. The metallocene derivatives each may be used alone or in combination of two or more kinds.

[Substrates]

Examples of a substrate employable in the display element of the present invention include synthetic plastic films, for example: polyolefins such as polyethylene or polypropylene, polycarbonates, cellulose acetate, polyethylene terephthalate, polyethylene dinaphthalene dicarboxylate, polyethyrene naphthalates, polyvinyl chloride, polyimide, polyvinyl acetals, and polystyrene. In addition, preferred are syndiocatic structured polystyrenes. These are prepared employing the methods described, for example, in each of JP-A Nos. 62-117708, 1-46912, and 1-178505. Further listed examples include metal substrates including stainless steel, paper supports such as baryta paper or resin coated paper, supports including the above plastic film having thereon a reflection layer, and those which are described in JP-A No. 62-253195 (pages 29-31) as a support. Further preferably employed are those described on page 28 of RD No. 17643, from the right column to the left column on page 648 of RD No. 18716, and on page 879 of RD No. 307105. As described in U.S. Pat. No. 4,141,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the present invention, employed as surface treatments may be a glow discharge treatment, an ultraviolet radiation irradiation treatment, a corona treatment and a flame treatment. Further employed may be supports described on pages 44-149 of Kochi Gijutsu (Prior Art Technology) No. 5 (published by AZTEC Corp., dated Mar. 22, 1991). Further listed are those described on page 1009 of RD No. 308119, as well as in the item "Supports" on page 108 of Product Licensing Index Volume 92. Other than the above, employed may be glass substrates as well as epoxy resins kneaded with glass powder.

[Electrodes]

In the display element according to the present invention, it is preferable that at least one of the opposed electrodes is a metal electrode. Employed as metal electrodes may be metals such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in electrolytes. Of these, a silver electrode or an electrode composed of silver in an amount of at least 80 percent is advantageous to maintain a reduced state of silver, and in addition, results in anti-staining of electrodes. Employed as methods for preparing electrodes may be conventional ones such as a evaporating method, a printing method, an ink-jet method, a spin coating method, or a CVD method.

Further, it is preferable that in the display element according to the present invention, at least one of the opposed electrodes is a transparent electrode. Transparent electrodes are not particularly limited as long as they are transparent and electrically conductive. Examples include indium tin oxide (ITO), indium zinc oxide (IZO), tin oxide, fluorine-containing tin oxide (FTO), indium oxide, zinc oxide, platinum, gold, silver rhodium, copper, chromium, carbon, aluminum, silicon, amorphous silicon, and BSO (bismuth silicon oxide). In order to form electrodes as described above, for example, an ITO layer may be subjected to mask evaporation on a substrate employing a sputtering method, or after forming an ITO layer on the entire surface, patterning may be performed employing a photolithographic method. The surface resistance value is preferably 100 Ω/sq or less, but is more preferably 10 Ω/sq or less. The thickness of the transparent electrodes is not particularly limited but is commonly 0.1-20 μm.
[Other Components Constituting the Display Element]

If desired, employed in the display element according to the present invention may be sealing agents, column-structured materials, and spacer particles.

Sealing agents are those to seal materials so that they do not leak out. Employed as sealing agents may be heat curing, light curing, moisture curing, and anaerobic curing type resins such as epoxy resins, urethane resins, acryl resins, vinyl acetate resins, enethiol resins, silicone resins, or modified polymer resins.

Column-structured materials provides strong self-supporting (strength) between substrates. For example, listed may be a cylindrical form, a quadrangular form, an elliptic cylindrical form, and a trapezoidal form which are arranged at definite intervals in a specified pattern such as a lattice. Further, employed may be stripe-shaped ones arranged at definite intervals. It is preferable that the column-structured materials are not randomly arranged but arranged at an equal distance, arranged so that the interval gradually varies, or a predetermined pattern is repeated at a definite cycle so that the distance between substrates is appropriately maintained and image display is not hindered. When the column-structured materials are such that the ratio of the area occupied by the display region of a display element is 1-40%, sufficient strength for commercial viability is obtained as a display element.

In order to maintain a uniform gap between paired substrates, provided may be spacers between them. As such spacers, exemplified may be spheres composed of resins or inorganic oxides. Further, suitably employed are adhesion spacers the surface of which is coated with thermoplastic resins. In order to maintain the uniform gap between substrates, provided may only be column-structured materials. However, both spacers and column-structured materials may be provided. In place of the column-structured materials, only spacers may be employed as a space-maintaining member. The diameter of spacers, when a column-structured material is formed, is at most its height, but is preferably equal to the height. When the column-structured material is not formed, the diameter of spacers corresponds to the distance of the cell gap.

[Screen Printing]

In the present invention, it is possible to form sealing agents, column-structured materials, and electrode patterns, employing a screen printing method. In screen printing methods, a screen on which predetermined patterns are formed is covered on the electrode surface, and printing materials (compositions to form column-structured materials such as light-curing resins) are placed on the screen. Subsequently a squeegee is moved at predetermined pressure, angle and rate. By such action, the printing materials are transferred onto the above substrate via the pattern of the screen. Then, the transferred materials are thermally cured and dried. When column-structured materials are formed employing the screen printing method, resinous materials are not limited to light-curing resins, but also employed, for example, may be heat curable resins such as epoxy resins or acryl resins, as well as thermoplastic resins. Listed as thermoplastic resins are polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluorocarbon resins, polyurethane resins, polyacrylonitrile resins, polyvinyl ether resins, polyvinylketone resins, polyether resins, polyvinylpyrrolidone resins, saturated polyester resins, polycarbonate resins, and chlorinated polyether resins. It is preferable that resinous materials are employed in the form of a paste while dissolved in suitable solvents.

As noted above, after forming the column-structured materials on the substrate, spacers are provided on at least one side of the substrate, and paired substrates are placed so that the electrode forming surfaces face each other, whereby a vacant cell is formed. By heating the paired facing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then liquid crystal composition may be sealed simultaneously when the substrates are allowed to adhere to each other.

[Driving Method of Display Element]

In the display element of the present invention, the preferable driving operation include depositing blackened silver by applying a voltage larger than the deposition overvoltage, followed by continuing the deposition of blackened silver by applying a voltage lower than the deposition overvoltage. By conducting the above driving operation, the writing energy and the load to the driving circuit can be reduced, and the writing rate can be increased. Generally, in the field of electrochemistry, it is well known that there exists an overvoltage in the electrode reaction. For example, a detailed description on the overvoltage is found page 121 of "Denshi-ido no kagaku-Denkikagaku Nyuumon" (1996, Asakura Publishing Co., Ltd.). In the display element of the present invention, the reaction between the electrode and silver contained in the electrolyte is considered to be an electrode reaction, and it is easily understood that an overvoltage exists when the dissolution and deposition of silver are carried out. The extent of an overvoltage depends on the exchange current density. Accordingly, it can be deduced that the surface of blackened silver has less excess electrical energy and injection of electrons is more easily carried out, because deposition of blackened silver can be continued at a lower applying voltage than the deposition overvoltage of silver.

The driving operation of the display element of the present invention may be via a simple matrix drive or an active matrix drive. "Simple matrix drive", as described in the present invention, refers to the driving method in which a plurality of positive electrode lines and a plurality of negative electrode lines are placed face to face so that the positive electrode lines and the negative electrode lines cross in right angles, and electric current is sequentially applied to these positive electrode lines and negative electrode lines. By employing the simple matrix driving, it is possible to simplify the circuit structure and the driving IC, resulting in advantages such as lower production cost. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function. For example, a circuit disclosed in FIG. 5 of JP-A No. 2004-29327 is usable.

[Application to Commercial Product]

It is possible to apply the display element of the present invention to electronic book related field, ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers, passports and electronic books.

EXAMPLES

The present invention will now be described with reference to examples, however, the present invention is not limited thereto. In the following examples, "parts" or "%" mean "mass parts" and "mass %", respectively, unless otherwise specified.

Example 1

Preparation of Display Element

Preparation of Display Element 1

Comparative Example

Preparation of Electrolyte Liquid 1

Into 2.5 g of dimethyl sulfoxide, 0.05 g of polyethylene glycol (average molecular weight: 500,000) was added and dissolved to obtain Electrolyte liquid 1.
(Preparation of Electrode 1)

Films of ITO (Indium Tin Oxide) of 130 μm width with 145 μm interval were formed on a 1.5 mm thick 2 cm×4 cm glass substrate according to the method known in the art. On the ITO films, films of titanium oxide (4-10 particles having an average diameter of 17 nm had been subjected to necking), the thickness of the film being 5 μm, were formed to obtain Electrode 1. Next, Ink 1 was prepared by dissolving Exemplified compound (A-115) in water/diethylene glycol/ethanol. Ink 1 was then applied on Electrode 1 at 120 dpi using an inkjet apparatus having a piezo head, whereby Electrode 1b was prepared. The "dpi" as mentioned in the present invention means the number of dots per 2.54 cm.
(Preparation of Electrode 2)

Silver-palladium electrodes of 0.8 μm thick and 130 μm pitch with 145 μm interval were formed on a 1.5 mm thick 2 cm×4 cm glass substrate according to the method known in the art to obtain Electrode 2.
(Preparation of Electrode 3)

On Electrode 2 of which peripheral part was edged with an olefin sealant containing 10% by volume of spherical glass beads having an average particles diameter of 40 μm, 100 μm in thickness of a mixed liquid was applied, the mixed liquid being obtained by dispersing 20% by mass of titanium oxide using a ultrasonic disperser in an isopropanol solution containing 2% by mass of polyvinyl alcohol (average polymerization degree of 3500 and saponification degree of 87%). Thereafter, the product was dried at 15° C. for 30 minutes to evaporate the solvent and then dried at 45° C. for 1 hour, whereby Electrode 3 was obtained.
(Preparation of Display Element)

Electrodes 3 and 1b were faced each other so that the striped electrodes of Electrodes 1 and 3 were perpendicularly crossed and heat pressed to form an empty cell. The empty cell was charged with Electrolyte liquid 1 under vacuum, followed by sealing the charging port with an UV curable epoxy resin, whereby Display element 1 was prepared.

Preparation of Display Element 2

Inventive Example

Preparation of Ink 2

In water/ethanol/ethylene glycol, 0.1 mol/L of ammonium acetate was dissolved, followed by adding ammonium so as to attain pH9, whereby Ink 2 was obtained.

Preparation of Ink 3

In water/ethanol/ethylene glycol, 0.1 mol/L of ammonium acetate was dissolved, followed by adding acetic acid so as to attain pH4, whereby Ink 3 was obtained.
(Preparation of Electrode 4)

On above Electrode 1b, Ink 2 was applied using an inkjet apparatus. After the ink solution was dried, Ink 3 was applied, and then the volatile component contained in the ink was dried, whereby Electrode 4 was obtained.
(Preparation of Display Element)

Display element 2 was prepared in the same manner as the preparation of Display element 1 except that Electrode 4 was used instead of Electrode 1b.

Preparation of Display Element 3

Inventive Example

Display element 3 was prepared in the same manner as the preparation of Display element 2 except that Exemplified compound (B-4) was used instead of Exemplified compound (A-115).

Preparation of Display Element 4

Inventive Example

Display element 4 was prepared in the same manner as the preparation of Display element 2 except that an iron complex represented as Exemplified compound (C-31) was used instead of Exemplified compound (A-115).
<<Evaluation of Display Element>>

Both electrodes of prepared display element were connected to both terminals of a constant voltage power source. While monitoring the reflectance of the display element using D65 light source of a spectrophotometer CM-3700d produced by Konica Minolta Sending Inc., a driving condition in which the ratio of the reflectances of the colored state and discolored state at 550 nm became 2 (the contrast was 2) was obtained. Then, repeated driving of ten thousand times under the above driving condition was carried out and the change in contrast was observed, whereby the ratio of contrast change (Contrast after driving ten thousand times)/(Contrast before driving ten thousand times) was determined. Obtained results were shown in Table 1.

TABLE 1

| Display element No. | Ratio of contrast change | Remarks |
|---|---|---|
| 1 | 0.54 | Comparative |
| 2 | 0.79 | Inventive |
| 3 | 0.81 | Inventive |
| 4 | 0.83 | Inventive |

It is clear from the results shown in Table 1 that the ratios of contrast change of the display elements meeting the constitution of the present invention are improved when compared with that of the comparative example.

Example 2

Preparation of Display Elements 5-8

Display elements 5-8 were prepared in the same manner as the preparation of Display elements 1-4, respectively, except that Electrolyte liquid 2 was used instead of Electrolyte liquid 1, Electrolyte liquid 2 being prepared by adding 0.1 g of silver iodide and 0.15 g of sodium iodide into Electrolyte liquid 1.
<<Evaluation of Display Element>>

The displayed color of each display element was observed in the same manner as the method described in Example 1 using a constant voltage electric source. It was found that each display element performed multicolor display of white, black and a color. Further, a ratio of contrast change (Contrast after driving ten thousand times)/(Contrast before driving ten thousand times) was determined for a color display of each display element in the same manner as described in Example 1. Obtained results were shown in Table 2.

TABLE 2

| Display element No. | Ratio of contrast change | Remarks |
|---|---|---|
| 5 | 0.52 | Comparative |
| 6 | 0.81 | Inventive |
| 7 | 0.83 | Inventive |
| 8 | 0.84 | Inventive |

It is clear from the results shown in Table 1 that the ratios of contrast change of the display elements meeting the constitution of the present invention are improved when compared with that of the comparative example, even for a color display.

Example 3

Preparation of Display Element

[Preparation of Display Element 9]

Electrolyte liquid 3 was prepared in the same manner as described for Electrolyte liquid 2 used in the preparation of Display element 5 in Example 2 except that 0.3 g of titanium oxide was added into Electrolyte liquid 2.

Electrode 5 was prepared by edging the peripheral of Electrode 2 described in Example 1 with an olefin sealant containing 10% by volume of spherical glass beads having an average particles diameter of 20 μm, by forming partition walls having windows of 100 μm square at portions crossing with Electrode 1 via photolithography, and by forming films of titanium oxide (4-10 particles having an average diameter of 17 nm had been subjected to necking), the thickness of the film being 5 μm on the ITO electrode. In each window, an ink containing the electrochromic dye used for preparing Display elements 2-4 was ejected by an inkjet apparatus to form a Bayer arrangement, whereby Electrode 6 was prepared.

Display element 9 was prepared in the same manner as the preparation of above Display element 5 except that Electrode 6 was used instead of Electrode 1b and Electrolyte liquid 3 was used instead of Electrolyte liquid 2.
[Preparation of Display Element 10]

After preparing Electrode 6 used for the preparation of above Display element 9, Ink 2 was applied on Electrode 6 using an inkjet apparatus, and, after drying the solvent of the ink, Ink 3 was applied, followed by drying the volatile component, whereby Electrode 7 was prepared.

Display element 11 was prepared in the same manner as the preparation of above Display element 9 except that Electrode 7 was used instead of Electrode 6.
Evaluation of Display Element When Display elements 9 and 10 prepared as above were evaluated in the same manner as described in Example 1 using a constant voltage electric source to obtain ratios of contrast change (Contrast after driving ten thousand times)/(Contrast before driving ten thousand times), the same effect as observed in Example 1 could be confirmed.

Example 4

Display elements 11 and 12 were prepared in the same manner as the preparation of Display elements 9 and 10, respectively, described in Example 3 except that Exemplified compound (A-113) was used instead of Exemplified compound (A-115), Exemplified compound (B-14) was used instead of Exemplified compound (B-4) and Exemplified compound (C-19) was used instead of Exemplified compound (C-31), and evaluated in the same manner to obtain ratios of contrast change (Contrast after driving ten thousand times)/(Contrast before driving ten thousand times). As the result, the same effect as observed in Example 3 could be confirmed.

Example 5

On Electrode 5, Ink 4 prepared by dissolving 2 wt % of polyethylene glycol (an average polymerization degree of 400) in water was applied using an inkjet apparatus so that the wet thickness on Electrode 5 was 2 μm, followed by drying the water at 85° C. for 60 minutes, whereby the surface of the titanium dioxide layer was blocked. Subsequently, Ink 1 was applied using an inkjet apparatus so that the wet thickness was 5 μm, followed by drying the solvent, whereby the electrochromic dye was adsorbed in the titanium dioxide layer which was not blocked. After that, the substrate was washed with water to remove polyethylene glycol which had been used for blocking. Finally, Ink 5 which was prepared by replacing A-115 in Ink 1 with A-113 was applied so that the wet thickness was 3 μm, followed by drying, whereby the electrochromic dye was adsorbed in the portion which had been blacked by polyethylene glycol. Display element 13 was prepared in the same manner as the preparation of Display element 6 with respect to other procedure. When the driving condition of Display element 13 was evaluated, display of 4 colors was recognized, namely, the display side electrode showed black in reduction state, showed 2 colors in oxidation side and showed white in the intermediate state. Further, the ratio of contrast change of Display element 13 was 0.88, which meant that Display element 13 exhibit an excellent property. Further, when the blocking treatment as described above was repeated twice, it was confirmed that three kinds of electrochromic dyes could be separately applied.

What is claimed is:

1. A method of manufacturing a display element comprising opposed electrodes having therebetween a porous layer comprising an electrochromic dye and a metal oxide supporting the electrochromic dye, the method comprising the steps of:
   (i) applying an ink containing the electrochromic dye on one pixel of a porous layer comprising the metal oxide using an inkjet apparatus;

(ii) applying an ink having a function to desorb the electrochromic dye from the porous layer on the pixel on which the ink containing the electrochromic dye has been applied to dissolve the electrochromic dye in the ink using the inkjet apparatus; and (iii) applying an ink having a function to readsorb the electrochromic dye to the porous layer on the pixel on which the ink having the function to desorb the electrochromic dye has been applied using the inkjet apparatus, whereby the electrochromic dye supported by the porous layer comprising the metal oxide in the pixel is uniformly diffused.

2. The method of claim 1, wherein in step (i), the ink containing the electrochromic dye contains water; wherein in step (ii), the ink having the function to desorb the electrochromic dye from the porous layer contains water; and wherein in step (iii), the ink having the function to readsorb the electrochromic dye to the porous layer contains water.

3. The method of claim 1, wherein the ink having the function to desorb the electrochromic dye from the porous layer is basic.

4. The method of claim 1, wherein the ink having the function to readsorb the electrochromic dye to the porous layer is acidic.

5. The method of claim 1, wherein the electrochromic dye is at least one compound selected from the group consisting of a compound represented by Formula (A), a compound represented by Formula (B) and a metal complex having a ligand represented by Formula (C):

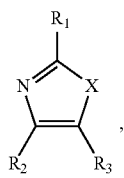

Formula (A)

wherein $R_1$ represents a substituted or nonsubstituted aryl group; $R_2$ and $R_3$ each represent a hydrogen atom or a substituent; and X represents >N—$R_4$, an oxygen atom or a sulfur atom, wherein $R_4$ represents a hydrogen atom or a substituent;

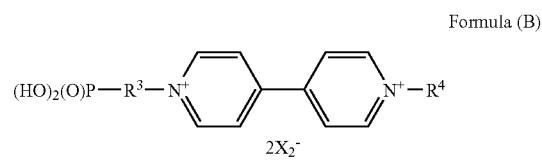

Formula (B)

wherein $R^3$ represents —$(CH_2)_m$—, wherein m is 0 or an integer of 1 to 10, an arylene group or a heteroarylene group, each having not more than 14 carbon atoms, a branched alkylene group, an alkenylene group, an aralkylene group or a cycloalkylene group each having not more than 10 carbon atoms, provided that the arylene group, the heteroarylene group, the branched alkylene group, the branched alkenylene group, and the cycloalkylene group optionally have a —P(O)(OH)$_2$ group through a —$(CH_2)_n$— group or may be arbitrary substituted, wherein n represents 0 or an integer of 1 to 10;

$R^4$ represents a group represented by $R_5$ or $R_6$, wherein $R_5$ represents —$(CH_2)_p$—, wherein p is 0 or an integer of 1 to 10, $R_6$ represents a —P(O)(OH)$_2$ group, an aryl group or a heteroaryl group each having not more than 14 carbon atoms, a branched alkyl group, an alkenyl group or a cycloalkyl group each having not more than 10 carbon atoms, or a hydrogen atom; and $X_2^-$ represent an ion neutralizing a charge; and

Formula (C)

wherein $X_1$ and $X_2$ each represent —$NR_1'$—, —S— or —O—, wherein $R_1'$ represents a hydrogen atom or a bond to form a double bond with a neighboring atom; $Y_1$ and $Y_2$ each represents $CR_2'$ or N, wherein $R_2'$ represents a hydrogen atom or a bond to form a double bond with a neighboring atom; $Z_1$ represents a group of atoms to form a heterocycle together with $X_1$ and $Y_1$; $Z_2$ represents a group of atoms to form a heterocycle together with $X_2$ and $Y_2$; and the heterocycle formed by $Z_1$, $X_1$ and $Y_1$, and the heterocycle formed by $Z_2$, $X_2$ and $Y_2$ each optionally have a substituent or optionally form a condensed ring.

* * * * *